United States Patent [19]
Sakamoto et al.

[11] Patent Number: 5,067,018
[45] Date of Patent: Nov. 19, 1991

[54] FREQUENCY-DIVISION MULTIPLEXING ARRANGEMENT FOR PREVENTING INTERFERENCE BETWEEN A MAIN TELEVISION SIGNAL AND A HELPER SIGNAL THEREOF

[75] Inventors: Noriya Sakamoto; Seijiro Yasuki, both of Yokohama; Kiyoyuki Kawai, Yokosuka, all of Japan

[73] Assignee: Kabushiki Kaisha Toshiba, Kawasaki, Japan

[21] Appl. No.: 531,745

[22] Filed: Jun. 1, 1990

[30] Foreign Application Priority Data

Jun. 7, 1989 [JP] Japan .................... 1-144947

[51] Int. Cl.$^5$ ............................... H04N 7/04
[52] U.S. Cl. ...................... 358/142; 358/12
[58] Field of Search ............ 358/142, 141, 12, 14, 358/15

[56] References Cited

U.S. PATENT DOCUMENTS

4,945,411  7/1990  Cavallerano ............... 358/142 X
4,985,769  1/1991  Yasumoto et al. .......... 358/142 X

FOREIGN PATENT DOCUMENTS

0084992  3/1989  Japan .

OTHER PUBLICATIONS

IEEE Transactions on Consumer Electronics, vol. 35, No. 3, pp. 133-141, Aug. 1989, "A Wide Screen EDTV", K. Kawai, S. Yasuki, N. Sakamoto.
IEEE Transactions on Communications, vol. COM-32, No. 8, Aug. 1984, pp. 948-953, "Extended Definition TV Fully Compatible with Existing Standards", Fukinuki et al.
IEEE Transactions on Broadcasting, vol. BC-33, No. 4, Dec. 1987, pp. 116-123, "Encoding for Compatibility and Recoverability in the ACTV System", Isnardi et al.

*Primary Examiner*—Victor R. Kostak
*Attorney, Agent, or Firm*—Oblon, Spivak, McClelland, Maier & Neustadt

[57] ABSTRACT

A main signal as the existing television signal and a helper signal for high definition are prepared in a transmitter. The energy of the main signal for a plurality of pixels is sequentially detected by an energy detector constituted by an absolute value circuit and an accumulator. The helper signal is controlled by a level controller, constituted by an adder and a divider, in such a way that its level follows according to the level of the detected energy. The level-controlled helper signal is frequency-multiplexed with the main signal having a frequency band of a removed region by a frequency multiplexer. A frequency-multiplexed signal separator of a receiver separates the mutiplexed signal into the main signal and the helper signal. The energy of the separated main signal for a plurality of pixels is sequentially detected by an energy detector constituted by an absolute value circuit and an accumulator. The separated helper signal has its frequency band restored to the original band from the removed region by a frequency domain restoring circuit. The restored helper signal is subjected to level control by a level controller, constituted by an adder and a multiplier, in the opposite characteristic to that of the sender side in accordance with the level of the detected energy.

14 Claims, 19 Drawing Sheets

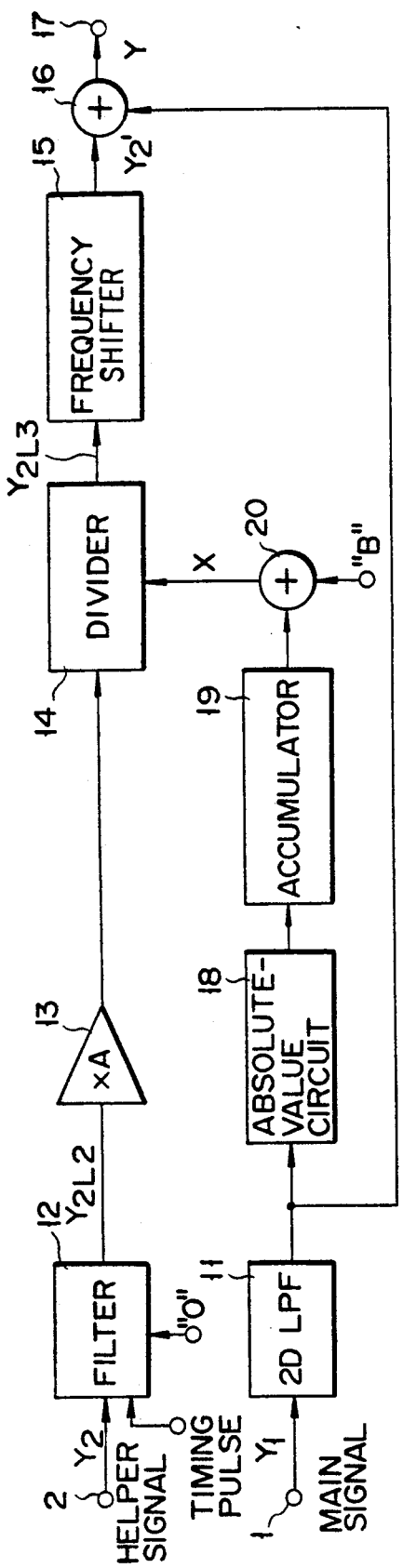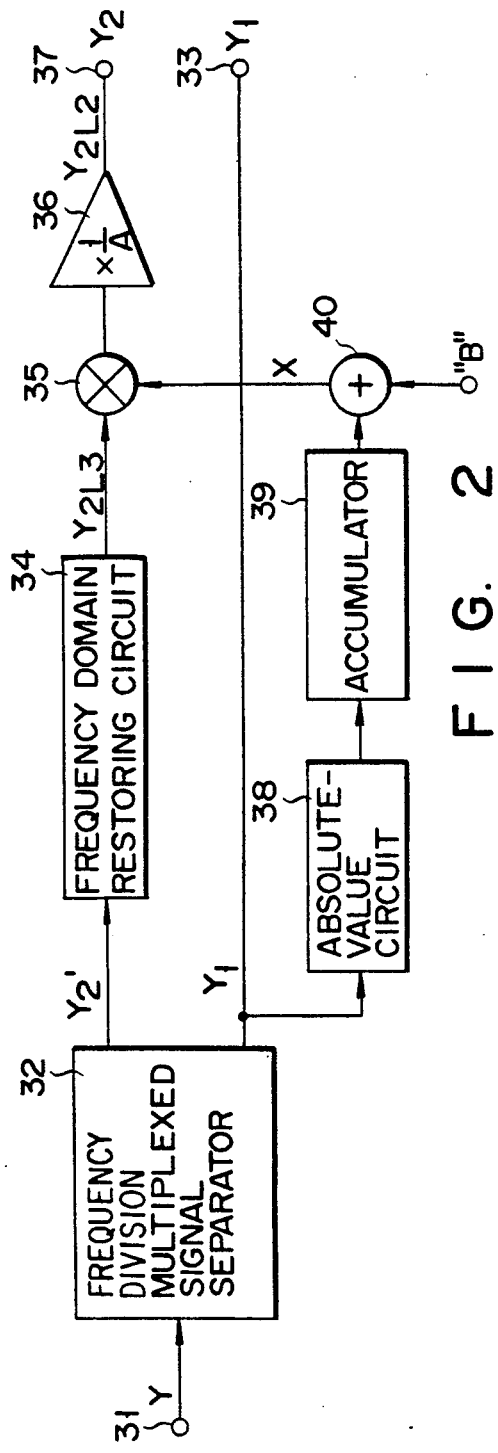
FIG. 1
FIG. 2

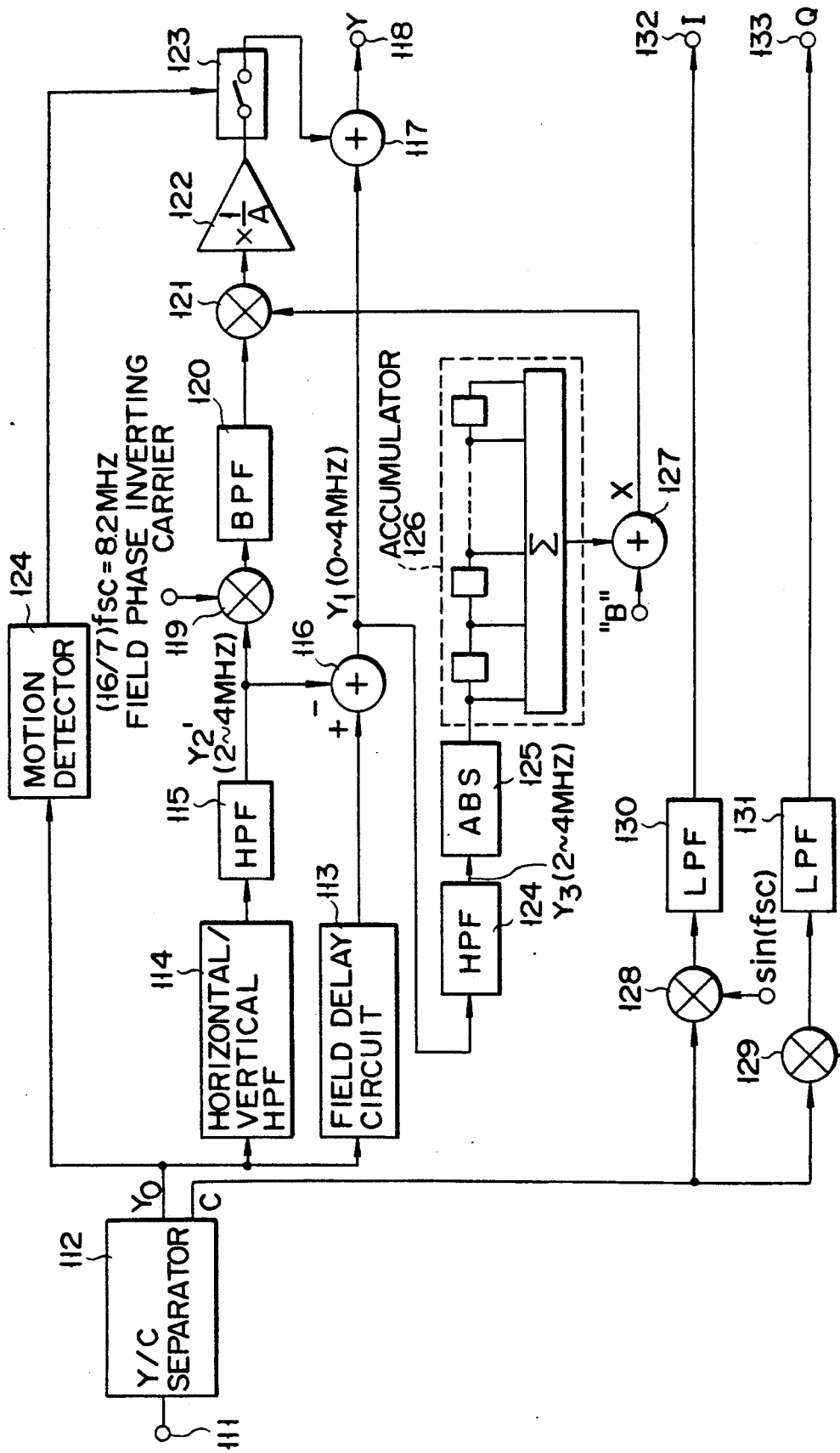
F I G. 6

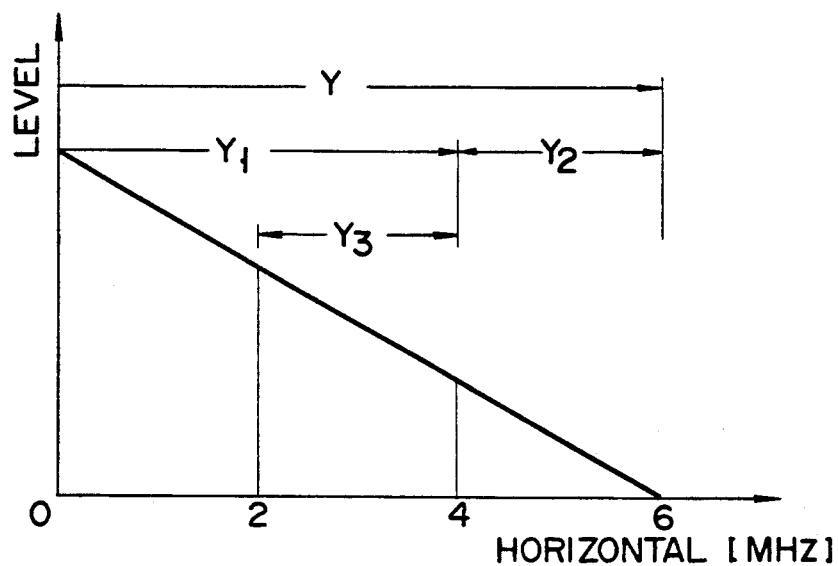
F I G. 7
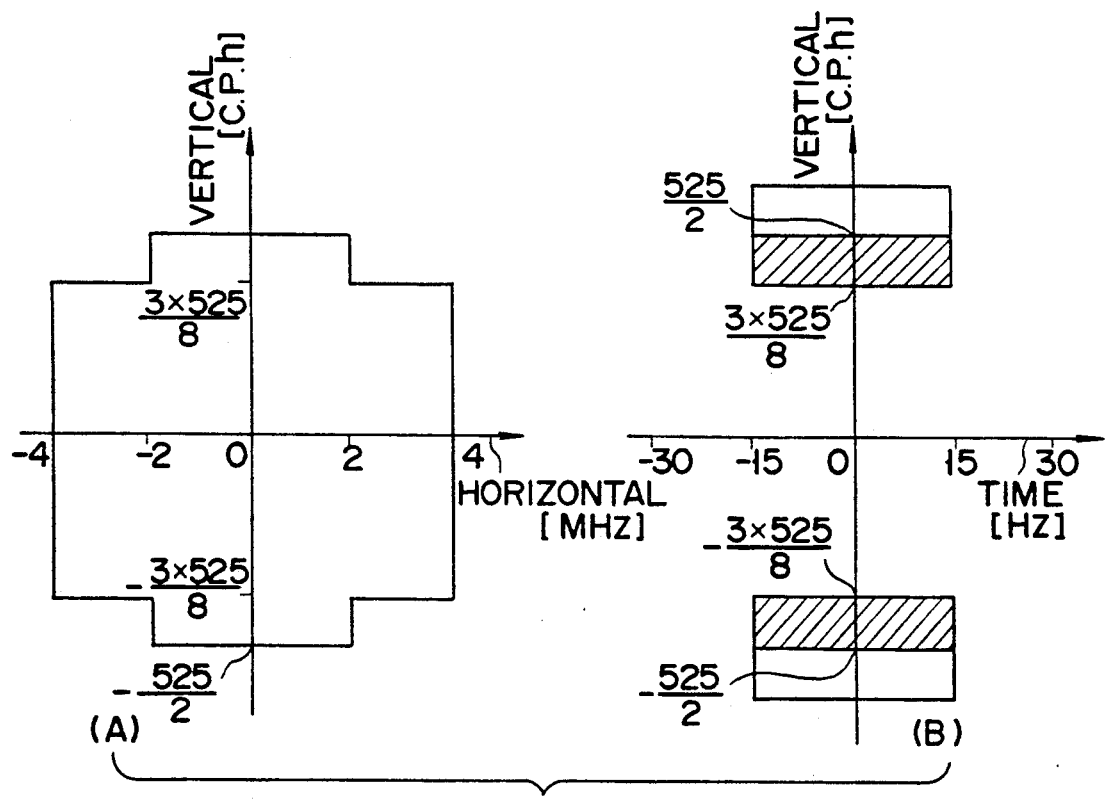
F I G. 8

(A)　　　　　　　　　　　(B)

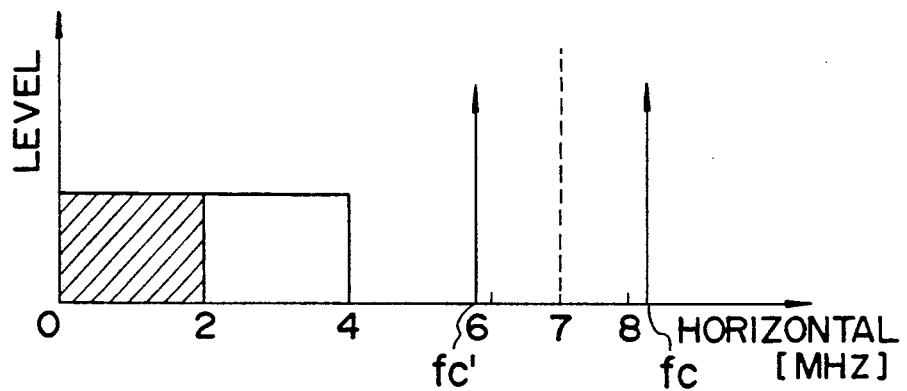
F I G. 11
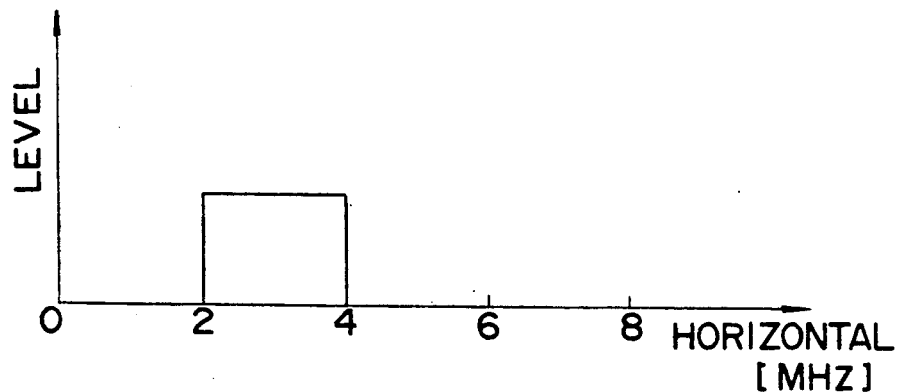
F I G. 12

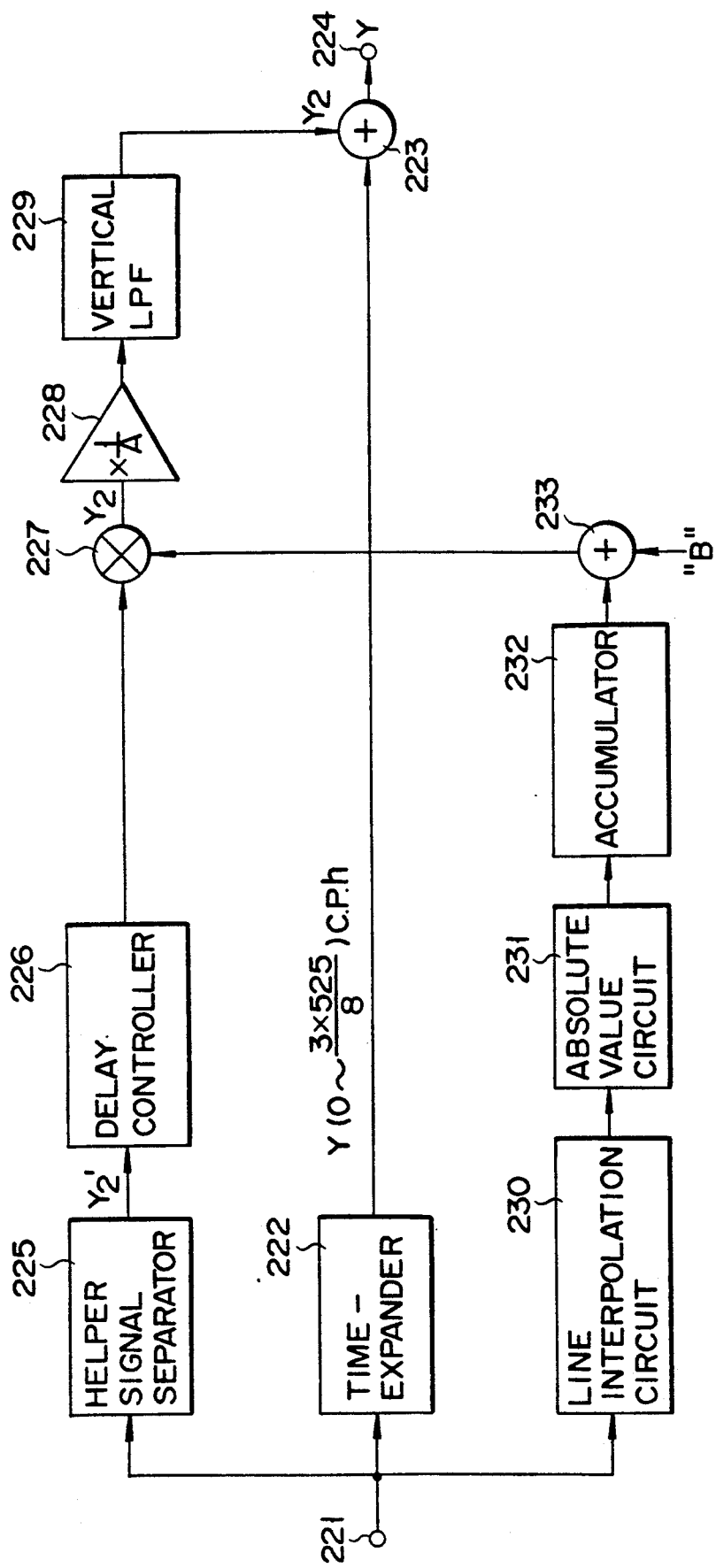
F I G. 23

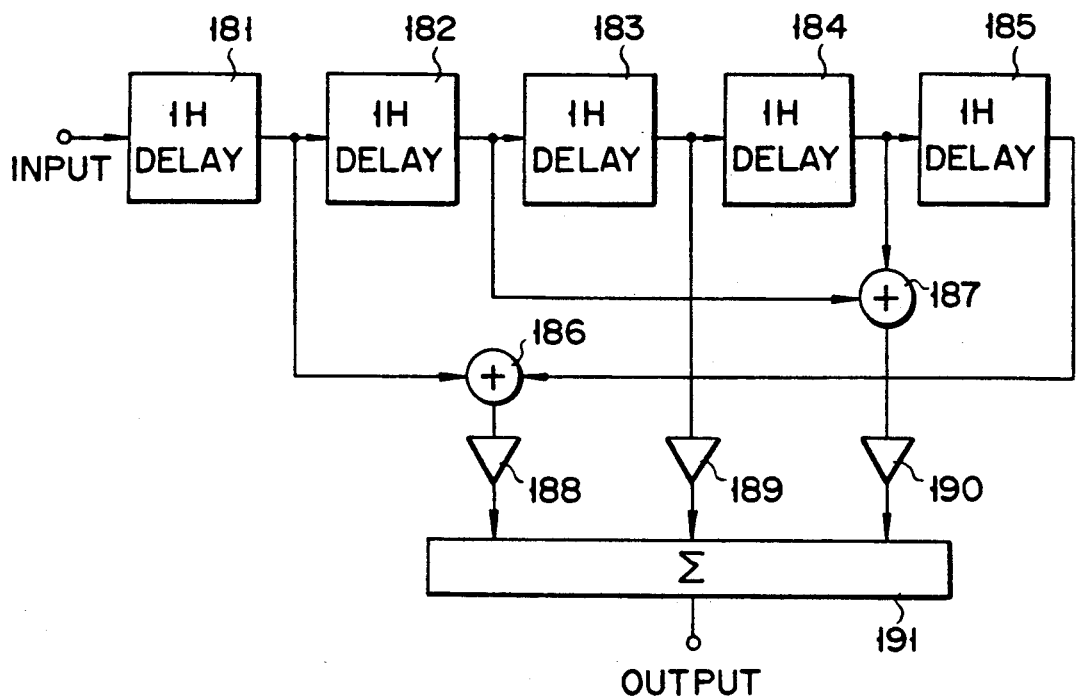
F I G. 28
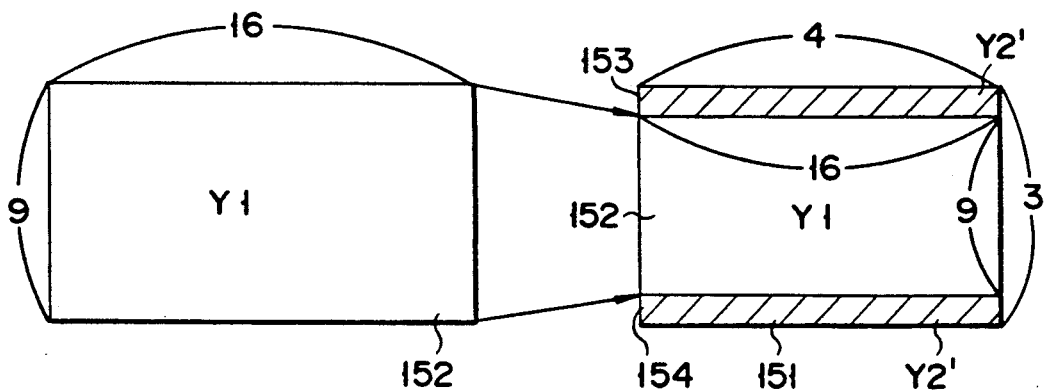
F I G. 29

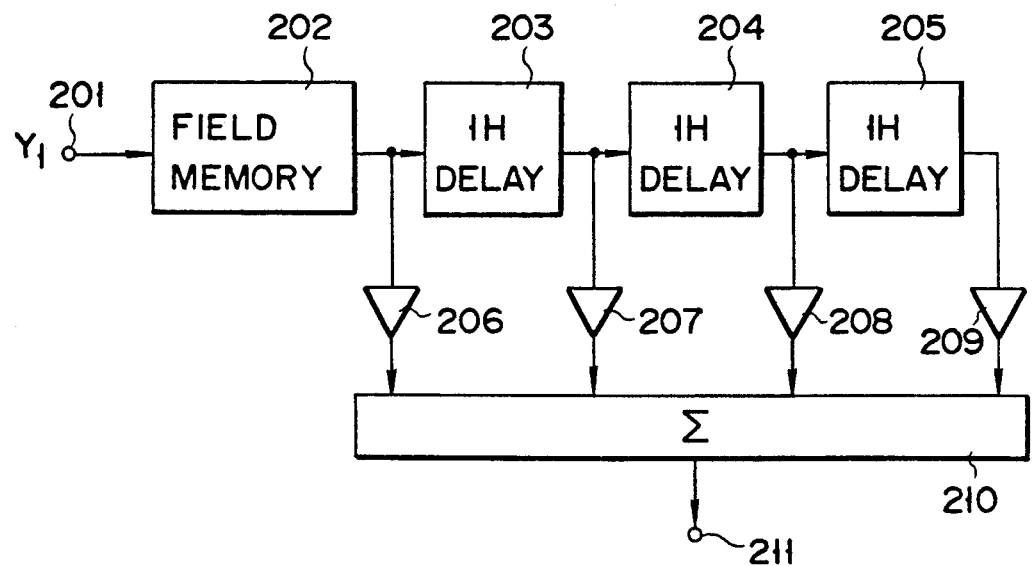
F I G. 30
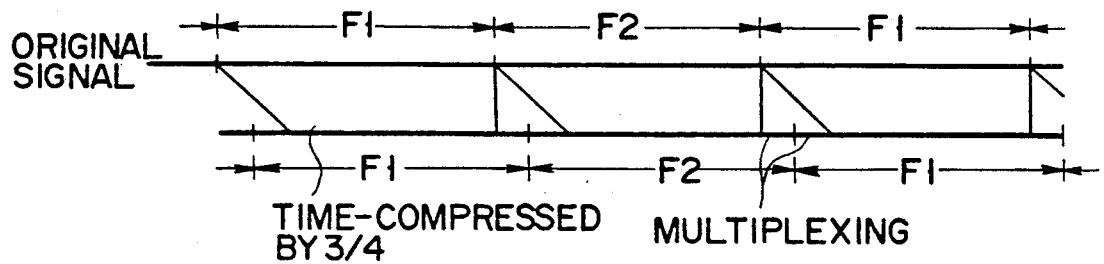
F I G. 31

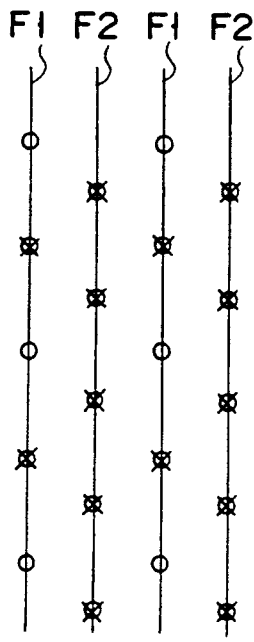
F I G. 32
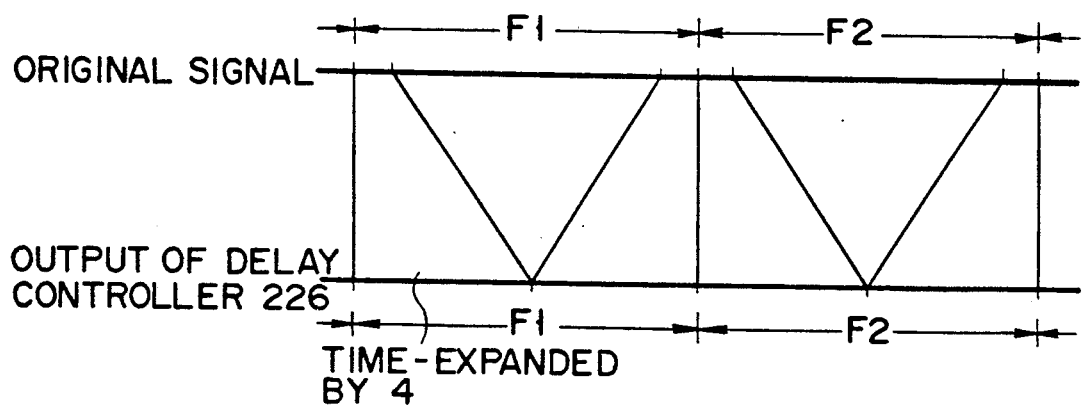
F I G. 33

FREQUENCY-DIVISION MULTIPLEXING ARRANGEMENT FOR PREVENTING INTERFERENCE BETWEEN A MAIN TELEVISION SIGNAL AND A HELPER SIGNAL THEREOF

BACKGROUND OF THE INVENTION

1. Field of the Invention

The present invention relates to a multiplexed signal transmitter which frequency-division multiplexes a television signal, compatible with the existing television system, with a television signal of a high-definition system, and transmits the multiplexed signal, and a multiplexed signal receiver which receives the multiplexed signal.

2. Description of the Related Art

Recently, research for and developments of a high-definition image have become prominent in the television broadcasting. In this high-definition system, a television signal of the existing system as a main signal is frequency-division multiplexed or frequency interleaved multiplexed with a television signal of a high-definition system as a helper signal in order to realize compatibility with existing systems. The helper signal typically includes a high-frequency component of a luminance signal or a signal or information corresponding to the side portion of a wide-aspect system. There are two frequency-division multiplexing systems of the above type: one is disclosed in T. Hukinuke et al., "Extended Definition TV Fully Compatible with Existing Standards" IEEE TRANSACTIONS COMMUNICATIONS, VOL. NO. 8, AUG. 1984 (hereinafter referred to as Publication 1) and the other is disclosed in M.A. Isnardi et al. "Encoding for Compatibility and Recoverability in the ACTV System" IEEE TRANSACTIONS BROADCASTING VOL. BC-33 NO. 4, DEC. 1987" (hereinafter referred to as Publication b 2).

The helper signal for providing high definition of the main signal does not contribute to image reproduction in the existing television receiver, and it is treated as a noise signal to the main signal. This would raise a problem of interference of the helper signal with the main signal. The helper signal is effectively used only in a television receiver of the high-definition system.

To eliminate the influence requires reduction in multiplexed level of the helper signal.

Reducing the multiplexed level of the helper signal, however, reduces the signal-to-noise (S/N) ratio so that the helper signal cannot be accurately reproduced in the high-definition television receiver.

Since the helper signal for the high-definition system is a high-frequency signal, the averaged power of the helper signal is considered comparatively lower than the averaged power of the main signal in view of the general property of the television signal. In this case, therefore, the interference of the helper signal with the main signal appears insignificant. However, this actually raises a problem of increasing the peak value of the main signal at the edge portion of an image. Because the edge portion of an image corresponds to a high-frequency signal, further multiplexing this signal with a helper signal (high-frequency signal) would cause the multiplexed signal to exceed a transmittable level. As a result, a reproduction signal of the edge portion of the image on the receiver side becomes inaccurate.

In order to solve this shortcoming, the system disclosed in the aforementioned Publication (2) employs a method of transmitting a helper signal in a non-linearly compressed format on the sender side and non-linearly expanding this signal for reproduction on the receiver side.

This method can reduce the interference of the helper signal with the edge portion of the main signal without reducing the S/N ratio of the helper signal.

This method, however, would raise the following two problems.

(1) First, the reproduced output of the helper signal has waveform distortion. In a non-linear compressing process, a harmonic component is generated. In transmitting a helper signal frequency-division multiplexed with a main signal, on the other hand, the transmission band of the helper signal is generally set to the same band as the spectrum band of the helper signal prior to compression in order to improve the efficiency of utilizing the transmission band. In this case, therefore, the harmonic component generated in the non-linear compressing process on the sender side would not be transmitted to the receiver side. Consequently, the helper signal acquired by the non-linear expanding process on the receiver side would have waveform distortion.

(2) The second problem is that such an arrangement causes visually unnatural deterioration of the quality of an image. In executing digital processing of the helper signal to be transmitted as an analog signal on the receiver side, an 8-bit circuit is often used as an analog-to-digital (A/D) converter. This arrangement is used because a 10-bit circuit significantly raises the cost for the overall circuit. Although the 8-bit circuit has a resolution of 256 gradations, it cannot ensure 10 to 20 gradations for a helper signal because the peak value of the helper signal should be compressed to 1/10 or less in order to eliminate the interference of the helper signal with the main signal. Such reduction in resolution not only increases quantized noise but also provides a visually unnatural image. In the above example, particularly, the reduced resolution would be further augmented in the non-linear expanding process carried out on the receiver side, thus making the unnaturalness of the reproduced image more prominent.

As described above, in the prior art apparatuses which frequency-division multiplex a helper signal for high definition, having a correlation with a main signal, with this main signal and transmit the multiplexed signal, although it is possible to eliminate the influence of the helper signal with the edge portion of the main signal, the helper signal cannot be accurately reproduced. The mentioned correlation is such that when the level of the main signal is high, the level of the helper signal is high, and when the level of the former signal is low, the level of the latter signal is also low.

SUMMARY OF THE INVENTION

Accordingly, it is an object of the present invention to provide a multiplexed signal transmitter and a multiplexed signal receiver, which can eliminate the influence of a helper signal at the edge portion of a main signal and accurately reproduce the helper signal.

To achieve this object, the multiplexed signal transmitter of this invention comprises an energy detector for detecting energy of a plurality of pixels of a main signal as a television signal; level controller for controlling the level of a helper signal having a correlation with the main signal, based on a detection output of the energy detector; and frequency-division multiplexer for frequency-division multiplexing the helper signal, having its level controlled by the level controller, with the main signal.

It is another object of this invention to provide a multiplexed signal receiver which receives a multiplexed signal that is acquired by frequency-division multiplexing a helper signal with a main signal, the helper signal having a correlation with the main signal, as a television signal.

To achieve the second object, the multiplexed signal receiver of this invention comprises a receiver for receiving a multiplexed signal acquired by frequency-division multiplexing a helper signals having a correlation with a main signal as a television signal, with the main signal, the helper signal having a level controlled on the basis of an output resulting from the detection of energy of a plurality of pixels of the main signal; frequency-division multiplexed signal separator for frequency-division separating the multiplexed signal into the main signal and the helper signal; an energy detector for detecting the energy of a plurality of pixels of the main signal separated by the frequency-division multiplexed signal separator; and level controller for controlling the level of the helper signal, separated by the frequency-division multiplexed signal separator, in a characteristic opposite to that obtained on a sender side, based on the detection output of the energy detector.

With the above arrangements, since the main signal and helper signal have a correlation, it is possible to ensure a correlation between an output resulting from the detection of the energy of the main signal and the helper signal. It is, therefore, possible to suppress the level of the helper signal at the edge portion of the main signal where the level of the energy detection output becomes large. The level suppression can reduce the interference of the helper signal with the main signal at its edge portion.

Further, since the detected energy is for a plurality of pixels, unlike the main signal, the detection output does not have a wide spectrum but has only a low-frequency component. Even if the level of the helper signal is controlled on the basis of the energy detection output, therefore, the spectrum of the helper signal does not become wider. This permits transmission of a level-controlled helper signal in the spectrum band of the original helper signal, so that a reproduced output of the helper signal does not have wave distortion.

Furthermore, since the main signal is sent as is to the receiver side, the receiver side can acquire quite the same energy of the main signal as the one obtained on the sender side. Accordingly, the original helper signal can accurately be reproduced on the receiver side without degrading the resolution at all.

In addition, as the level control on the sender side and that on the receiver side need to have the opposite characteristics, there is a more freedom in selecting the required control mode.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit diagram illustrating the structure of the first embodiment of a multiplexed signal transmitter according to the present invention;

FIG. 2 is a circuit diagram illustrating the structure of the first embodiment of a multiplexed signal receiver according to the present invention;

FIG. 6 is a circuit diagram illustrating the structure of the third embodiment of a multiplexed signal receiver according to the present invention;

FIG. 7 is a chart showing the band characteristic of an input signal to the circuit shown in FIG. 5;

FIGS. 8A and 8B are spectrum diagrams in a spatial frequency region given for explaining the band-limiting function of a 2D LPF shown in FIG. 5;

FIG. 11 is a spectrum diagram along the horizontal frequency axis of the output of a multiplier shown in FIG. 5;

FIG. 12 is an explanatory diagram of the spectrum along the horizontal frequency axis of the output of a BPF shown in FIG. 5;

FIG. 23 is a circuit diagram illustrating the fourth embodiment of a multiplexed signal receiver according to this invention;

FIG. 28 is a circuit diagram illustrating a specific structure of the vertical LPF 162 shown in FIG. 22;

FIG. 29 is a diagram illustrating the screen format for explaining the operation of a time-compressor shown FIG. 30 is a diagram illustrating a specific structure of the time-compressor shown in FIG. 22;

FIG. 31 is an explanatory diagram of a timecompressed field signal given for explaining the operation of the time-compressor shown in FIG. 30;

FIG. 32 is a diagram presented for explaining the operation of a line interpolation circuit shown in FIG. 22; and FIG. 33 is an explanatory diagram of the time axis given for explaining the operation of a delay controller shown in FIG. 23.

DETAILED DESCRIPTION OF THE PREFERRED EMBODIMENTS

Figure 3:
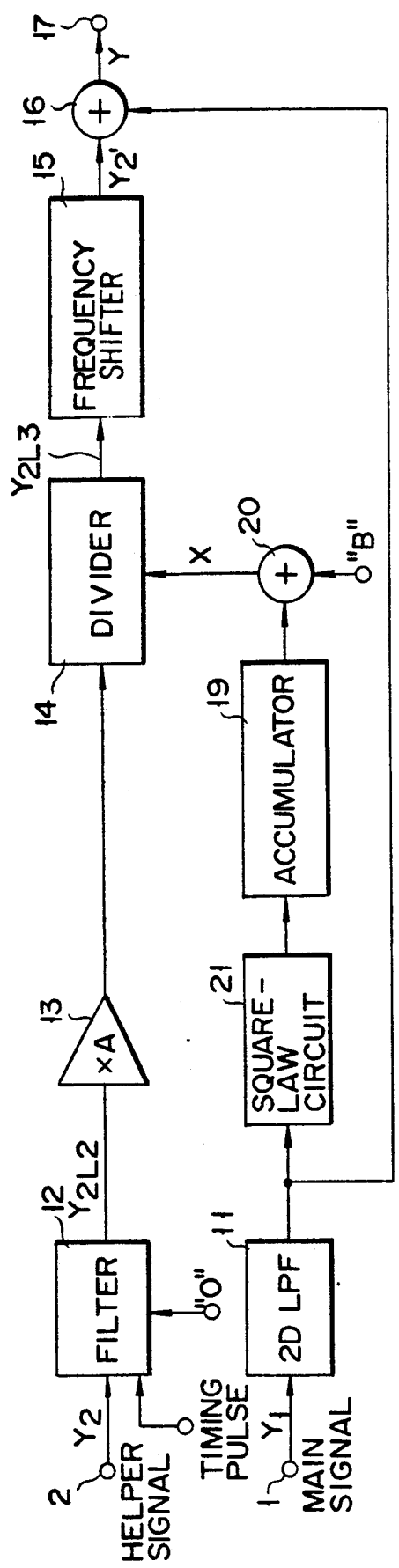
FIG. 3 is a circuit diagram illustrating the structure of the second embodiment of a multiplexed signal transmitter according to the present invention.

Preferred embodiments of this invention will now be described in detail referring to the accompanying drawings.

FIG. 1 is a circuit diagram illustrating the structure of the first embodiment of a multiplexed signal transmitter according to the present invention. FIG. 2 is a circuit diagram illustrating the structure of the first embodiment of a multiplexed signal receiver according to this invention. Neither FIG. 1 nor FIG. 2 shows a system for processing a chrominance signal.

To begin with, the multiplexed signal transmitter shown in FIG. 1 will be described below.

Referring to FIG. 1, numeral 1 denotes an input terminal for a main signal $Y_1$ of a luminance signal Y, and numeral 2 an input terminal for a helper signal $Y_2$ of the luminance signal Y. The main signal $Y_1$ and the helper signal $Y_2$ have a correlation; for example, they are a low-frequency component and a high-frequency component of a television signal, respectively. In this example, the main signal $Y_1$ is a low-frequency component transmittable in a band of the existing system, while the helper signal $Y_2$ is a high-frequency component exceeding this band of the existing system.

The main signal $Y_1$ input through the input terminal 1 is supplied to a two-dimensional (2D) low-pass filter (LPF) 11, which subjects the main signal $Y_1$ to band-limitation. This band-limitation is executed to provide space in part of a spatial frequency region of the main signal $Y_1$ and put a helper signal (which will be described later) in this space. The main signal $Y_1$ from the 2D LPF 11 is supplied to an adder 16 where it is frequency-division multiplexed with a helper signal $Y_2'$ acquired through level control. This multiplexed signal will be transmitted by a transmitting section (not shown) connected to an output terminal 17.

The level of the helper signal $Y_2'$ is controlled as follows.

The helper signal $Y_2$ input through the input terminal 2 is supplied to a filter 12 which limits the band of the helper signal $Y_2$ in such a way that the band of this helper signal matches with the space in the main signal $Y_1$, in a case where the helper signal is frequency-division multiplexed with the main signal. The output from the filter 12, $Y_{2L2}$, is multiplied by a factor of A (constant) in a level converter 13. This level-converted output is supplied to a divider 14 where it is subjected to division using a control signal X (energy information) as a divisor, acquired from the main signal $Y_1$. A helper signal $Y_{2L3}$ acquired by this division is shifted to a band suitable for frequency-division multiplexing with the main signal $Y_1$ by a frequency shifter 15. The resultant signal $Y_2'$ is frequency-division multiplexed with the main signal $Y_1$ by the adder 16.

The control signal X is acquired as follows.

The main signal $Y_1$ from the 2D LPF 11 is supplied to an absolute value circuit 18 which obtains its absolute value. The absolute value is accumulated for N pixels (N being an integer equal to or greater than 2) by an accumulator 19. The accumulated output is added to a predetermined field value B by an adder 20. The added result is used as the aforementioned control signal X. The fixed value B, a rational number; serves to prevent the output of the subsequent division from going to infinity when the accumulated output is 0.

The thus acquired control signal X is expressed by equation (1) below.

$$X = \Sigma X_O + B \quad ...(1)$$

As the helper signal $Y_2$ is divided by this control signal X, the helper signal $Y_{2L3}$ from the divider 14 is expressed as follows:

$$Y_{2L3} = Y_{2L2}/X \quad ...(2)$$

The multiplexed signal receiver shown in FIG. 2 will now be described.

Referring to FIG. 2, numeral 31 denotes an input terminal to which a multiplexed signal Y is input. This multiplexed signal from the input terminal 31 is separated into a main signal $Y_1$ and a helper signal $Y_2'$ by a frequency-division multiplexed signal separator 32.

The main signal $Y_1$ separated by the signal separator 32 is supplied to an image display section (not shown) connected to an output terminal 33. As the helper signal $Y_2'$ has its frequency domain shifted by the frequency shifter 15 on the sender side, this domain restoring circuit 34 so that the signal becomes a helper signal $Y_{2L3}$. This helper signal $Y_{2L3}$ is multiplied by a control signal X, acquired from the main signal $Y_1$, by a multiplier 35. This control signal X, like the one obtained on the sender side, takes a value expressed by the equation (1). Level-converting the output of the multiplier 35 by a level converter 36, therefore, yields a helper signal $Y_{2L2}$ as expressed by the following equation (3).

$$Y_{2L2} = Y_{2L3} \cdot X \quad ...(3)$$

The level converter 36 has the opposite characteristic to that of the level converter 13 located on the sender side, and multiplies the input signal by a factor of 1/A. The level-converted output is supplied to the image section (not shown) connected to an output terminal, and is displayed together with the main signal $Y_1$.

The reproduced helper signal $Y_{2L2}$ is the helper signal $Y_2$ on the sender side, band-limited in the vertical direction. As the helper signal $Y_{2L2}$ has a sufficient amount of information with respect to the horizontal direction, it can be used together with the main signal $Y_1$ for the purpose of image display with hardly any visual difference between the quality of the resultant image and that of the image processed on the sender side.

The control signal X, as on the sender side, is prepared by an absolute value circuit 38, an accumulator 39 and an adder 40.

As described above, according to this embodiment, using the correlation between the main signal $Y_1$ and helper signal $Y_2$, on the sender side, the energy of the main signal $Y_1$ for N pixels is acquired by accumulation of the absolute values. The helper signal $Y_2$ is divided by the control signal X obtained on the basis of the energy, the resultant output $Y_2'$ is frequency-division multiplexed with the main signal $Y_1$ prior to transmission, while, on the receiver side, the energy of the main signal $Y_1$ for N pixels is acquired by accumulation of the absolute values and the helper signal $Y_2'$ is multiplied by the control signal X obtained on the basis of the energy, to thereby reproduce the original helper signal $Y_2$.

With the above arrangements, since the main signal $Y_1$ and helper signal $Y_2$ have a certain correlation, it is possible to ensure a correlation between the control signal X and the helper signal $Y_2$. It is therefore possible to suppress the level of the helper signal $Y_2$ at the edge portion of the main signal $Y_1$ where the level of the energy detection output becomes large. The level suppression can reduce the interference of the helper signal $Y_2$ with the main signal $Y_1$ at its edge portion.

Further, since the control signal X represents the energy for N pixels, unlike the main signal $Y_1$, the control signal X does not have a wide spectrum but has only a low-frequency component. Even if the helper signal $Y_2$ is divided by the control signal X, the spectrum of the helper signal $Y_2'$ hardly differs from the spectrum of the original helper signal $Y_2$. This permits transmission of the entire helper signal $Y_2'$ after division in the spectrum band of the original helper signal $Y_2$, so that a reproduced output of the helper signal $Y_2$ does not have wave distortion.

Furthermore, since the main signal $Y_1$ is sent as it is to the receiver side, processing this main signal $Y_1$ on the receiver side can provide nearly the same control signal as the control signal X obtained on the sender side. Accordingly, the original helper signal $Y_2$ can accurately be reproduced on the receiver side without degrading the resolution at all.

In addition, since the control signal X is the accumulated output of the main signal $Y_1$ added with the fixed value B, the result of the division can be prevented from becoming infinite even if the accumulated output is 0.

Figure 4:
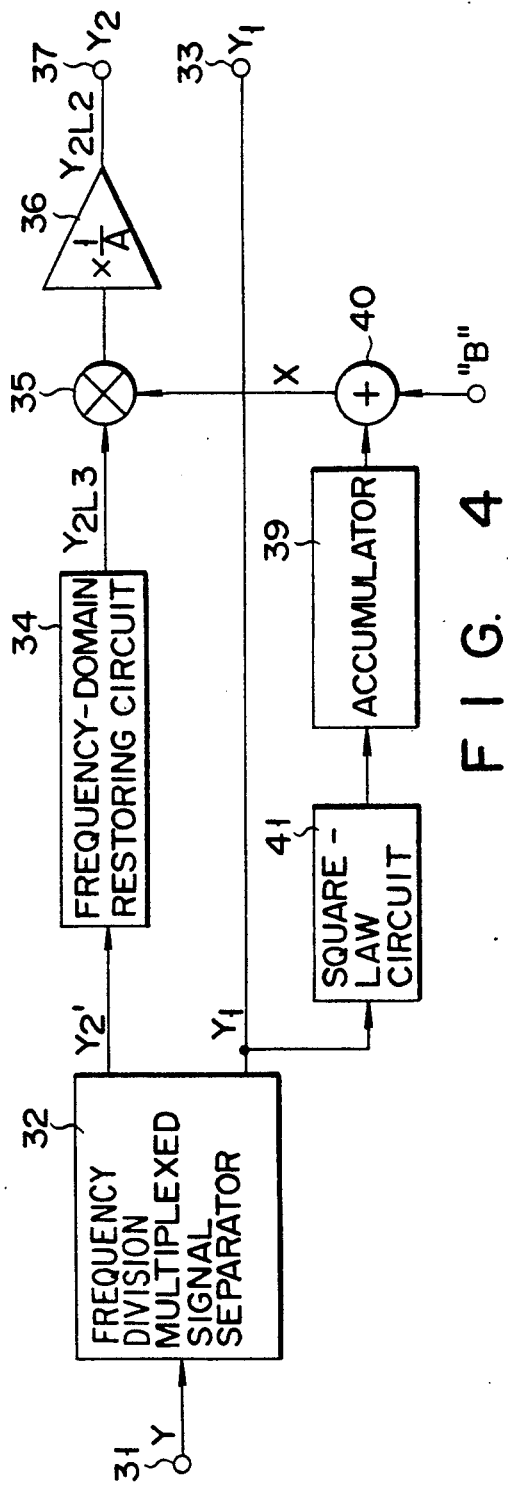
FIG. 4 is a circuit diagram illustrating the structure of the second embodiment of a multiplexed signal receiver according to the present invention.

FIG. 3 is a circuit diagram illustrating the structure of the second embodiment of a multiplexed signal transmitter according to the present invention. FIG. 4 is a circuit diagram illustrating the structure of the second embodiment of a multiplexed signal receiver according to this invention.

In FIGS. 3 and 4, those components corresponding to or identical to those of the first embodiment are given the same reference numerals, thus omitting their redundant description.

The description of the previous embodiment has been given with reference to a case where the absolute value of the main signal $Y_1$ is accumulated in order to acquire the control signal X. In the second embodiment, in contrast, a square of the main signal $Y_1$ is accumulated. That is, the absolute value circuits 18 and 38 in FIGS. 1 and 2 are replaced with square-law circuits 21 and 41 in FIGS. 3 and 4.

With these arrangements, it is possible to acquire the energy of the main signal $Y_1$ for N pixels as per the first embodiment.

The multiplexed signal transmitter and multiplexed signal receiver of the second embodiment are utilized in transmitting and receiving a helper signal for a television signal of, for example, a wide aspect system compatible with the existing NTSC television system. These apparatuses may be utilized by a method as disclosed in a document "A WIDE SCREEN EDTV, IEEE Transaction on Consumer Electronics, Vol. 35, No. 3, AUG. 1989," presented by the present inventors. This document discloses a wide aspect television signal being separated into a center panel signal and a side panel signal. The side panel signal is further separated into a low-frequency component and a high-frequency component (0.9 MHz or below). The low-frequency component is time-multiplexed with the horizontal over-scanned portion. The high-frequency component is separated into first and second field signals, the first field signal being frequency-division multiplexed with the screen center and the latter being time-multiplexed with the vertical over-scanned portion. At this time, level control is executed by the energy of the second field signal for a plurality of pixels in such a way as to prevent the first field signal from interfering with the screen center signal. In other words, because the first and second field signals have a correlation, even if the level of the first field signal is controlled on the basis of the information on the energy of the second field signal for a plurality of pixels on the sender side, the level of the first field signal on the receiver side can be restored to the same level as provided on the sender side.

The apparatuses of the second embodiment may use the first field signal as a main signal and the second field signal as a helper signal. In brief, the present invention is characterized in that information on the energy of the main signal is used to suppress the level of the helper signal during transmission to thereby prevent the helper signal from interfering with another signal. Such other signal may be the main signal itself as in the above embodiment or the center signal as disclosed in the aforementioned document authored by the present inventors.

Figure 5:
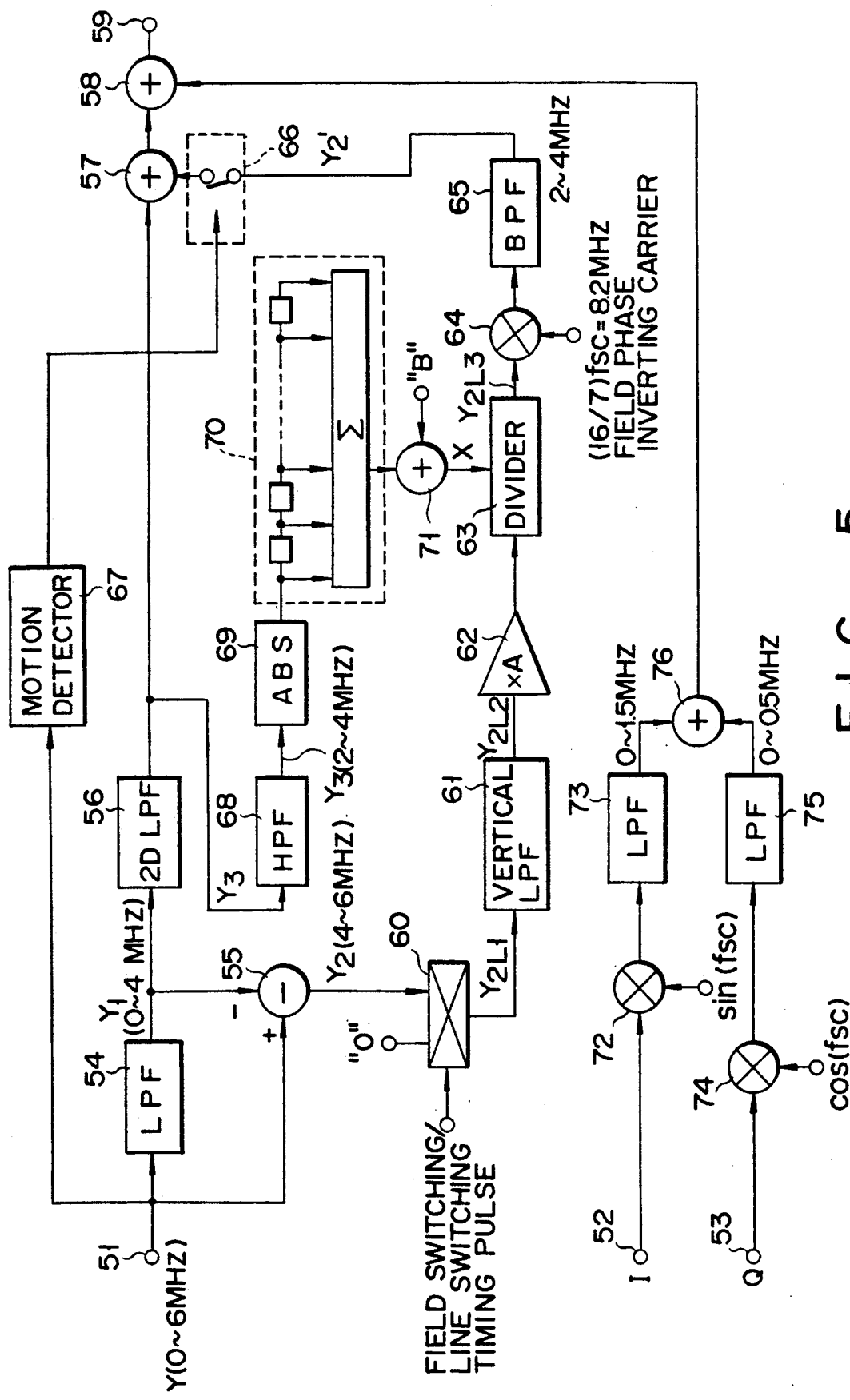
FIG. 5 is a circuit diagram illustrating the structure of the third embodiment of a multiplexed signal transmitter according to the present invention.

FIG. 5 is a circuit diagram illustrating the structure of the third embodiment of a multiplexed signal transmitter according to the present invention. FIG. 6 is a circuit diagram illustrating the structure of the third embodiment of a multiplexed signal receiver according to this invention.

According to this embodiment, the present invention is applied to a system for transmitting a horizontal high definition signal as a helper signal.

The following description will be given with reference to a case where the existing system is the NTSC system.

First, the multiplexed signal transmitter shown in FIG. 5 will be described below.

Referring to FIG. 5, numeral 51 denotes an input terminal for a luminance signal Y of a color television signal, and numeral 52 an input terminal for a chrominance signal I.

The luminance signal Y from the input terminal 51 has a horizontal band of 0 to 6 Hz as shown in FIG. 7. This luminance signal is separated into a main signal $Y_1$ having a horizontal band of 0 to 4 MHz and a helper signal $Y_2$ having a horizontal band of 4 to 6 MHz by a LPF 54 with a cut-off frequency of 4 MHz and a subtracter 55. FIG. 7 illustrates the main signal $Y_1$ and helper signal $Y_2$. Here, the main signal $Y_1$ is used as a luminance signal of the NTSC system, while the helper signal $Y_2$ is used as a luminance signal for high definition.

The main signal $Y_1$ from the LPF 54 is band-limited by a horizontal/vertical, 2D LPF 56. FIG. 8 illustrates how the band-limitation is done. FIG. 8A illustrates the spectrum of a horizontal-vertical spatial frequency region, and FIG. 8B the spectrum of a time-vertical spatial frequency region. As shown in FIG. 8A, the LPF 56 eliminates a component of a horizontal frequency of $\pm 2$MHz or above and a vertical frequency of $\pm(3\times 525)/8$ to $525/2$[c.p.h]. This eliminated region, shown by the shaded portion in FIG. 8B, is used as a region for multiplexing a helper signal. Even if the main signal $Y_1$ has such a eliminated region, the component in this region is an image component in an oblique direction on the screen and is not caught by human eyes, so that the resolution would not be reduced. A specific structure of the LPF 56 will be described later.

The output of the LPF 56 is frequency-division multiplexed with a helper signal $Y_2'$, acquired through a division (its detailed description will be given later), by an adder 57. In this case, the helper signal $Y_2'$ (which will be described in detail later) is frequency-shifted so that it can be frequency-multiplexed with the eliminated region of the main signal $Y_1$ processed by the LPF 56.

The multiplexed signal is frequency-multiplexed with chrominance signals I and Q having undergone a multiplexing process. The resultant, multiplexed signal is transmitted to a receiver side by a transmitting section (not shown) connected to an output terminal 59.

The division of the helper signal $Y_2$ will be executed as follows.

Figure 9:
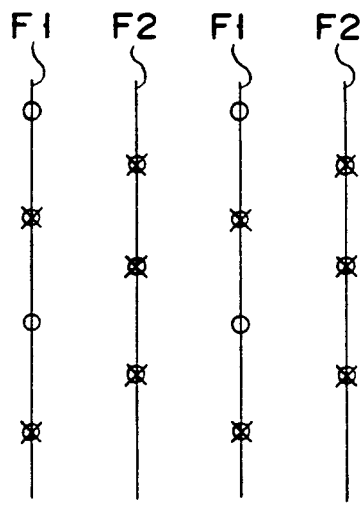
FIG. 9 is an explanatory diagram of a field signal for explaining the output of a selector shown in FIG. 5.

Of the helper signal $Y_2$ from the subtracter 55, those signals for every other line in the first field $F_1$ and every signal in the second field $F_2$ are replaced with 0-level signals. FIG. 9 illustrates the process; positions marked by "x" are where the signals are replaced with 0-level signals. Through this replacement, the vertical band of the helper signal $Y_2$ becomes 525/8 [c.p.h]. This yields a helper signal $Y_{2L1}$ having the same vertical domain as the main signal $Y_1$ processed by the aforementioned LPF 56.

Figure 10:
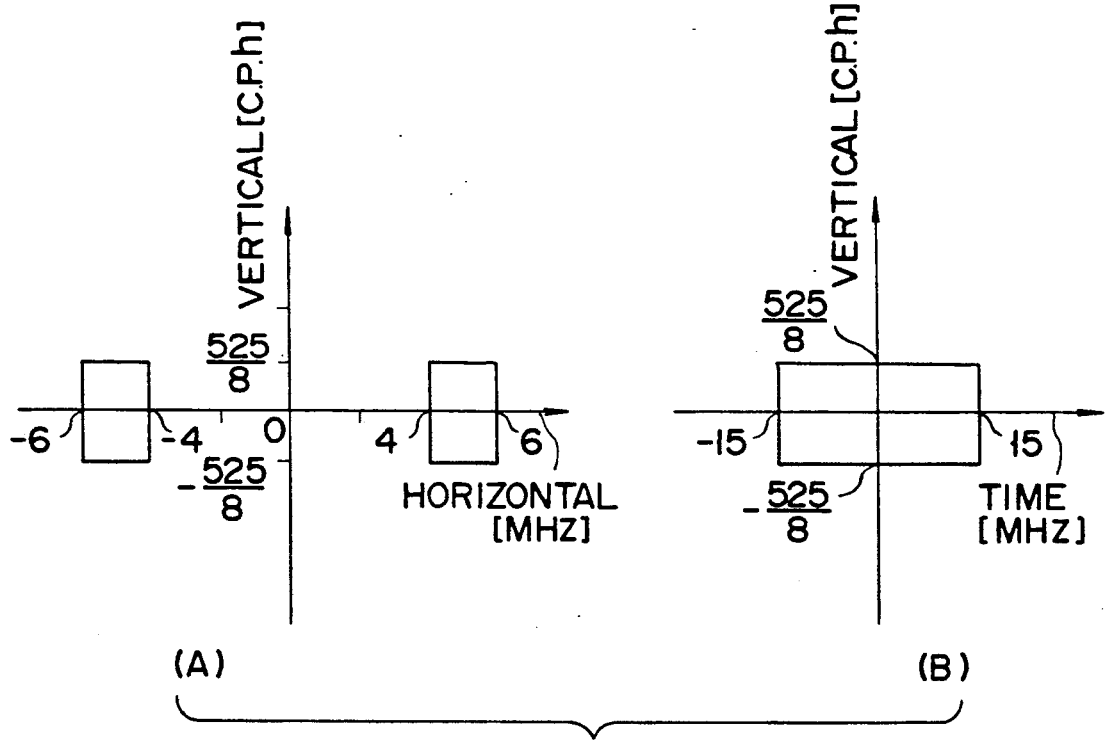
FIGS. 10A and 10B are spectrum diagrams in a spatial frequency region for the output of a vertical LPF shown in FIG. 5.

The output of a selector 60, $Y_{2L1}$, is supplied to a vertical LPF 61 which removes a vertical returning component generated by the above process. FIG. 10 illustrates the output characteristic of the LPF 61. FIG. 10A illustrates the spectrum of the horizontalvertical region, and FIG. 10B the spectrum of the timevertical region. A specific structure of the LPF 61 will be described later. The selector 60 and the vertical LPF 61 correspond to the filter 12 in FIG. 1.

The helper signal $Y_{2L2}$ output after undergoing band-limiting process in the LPF 61 is multiplied by a factor of A (constant) by a level converter 62. The output of this level converter 62 is divided by a control signal X, acquired from the main signal $Y_1$, by a divider 63. The result $Y_{2L3}$ is processed to have its frequency domain shifted by a frequency multiplexer, thereby providing a helper signal $Y_2'$ expressed by the aforementioned equation (2). Generation of the control signal X will be described later.

The helper signal $Y_{2L3}$ from the divider 63 is modulated by a multiplier 64, using a carrier signal which has a frequency of 16/7 fsc (= 8.2 MHz) and whose phase inverts every field; fsc is a color subcarrier frequency. The modulation yields the helper signal $Y_2'$ which is located in the eliminated region of the LPF 56. FIG. 11 shows the spectrum after modulation in a case where the sampling frequency of a luminance signal Y is 4 fsc.

Figure 13:
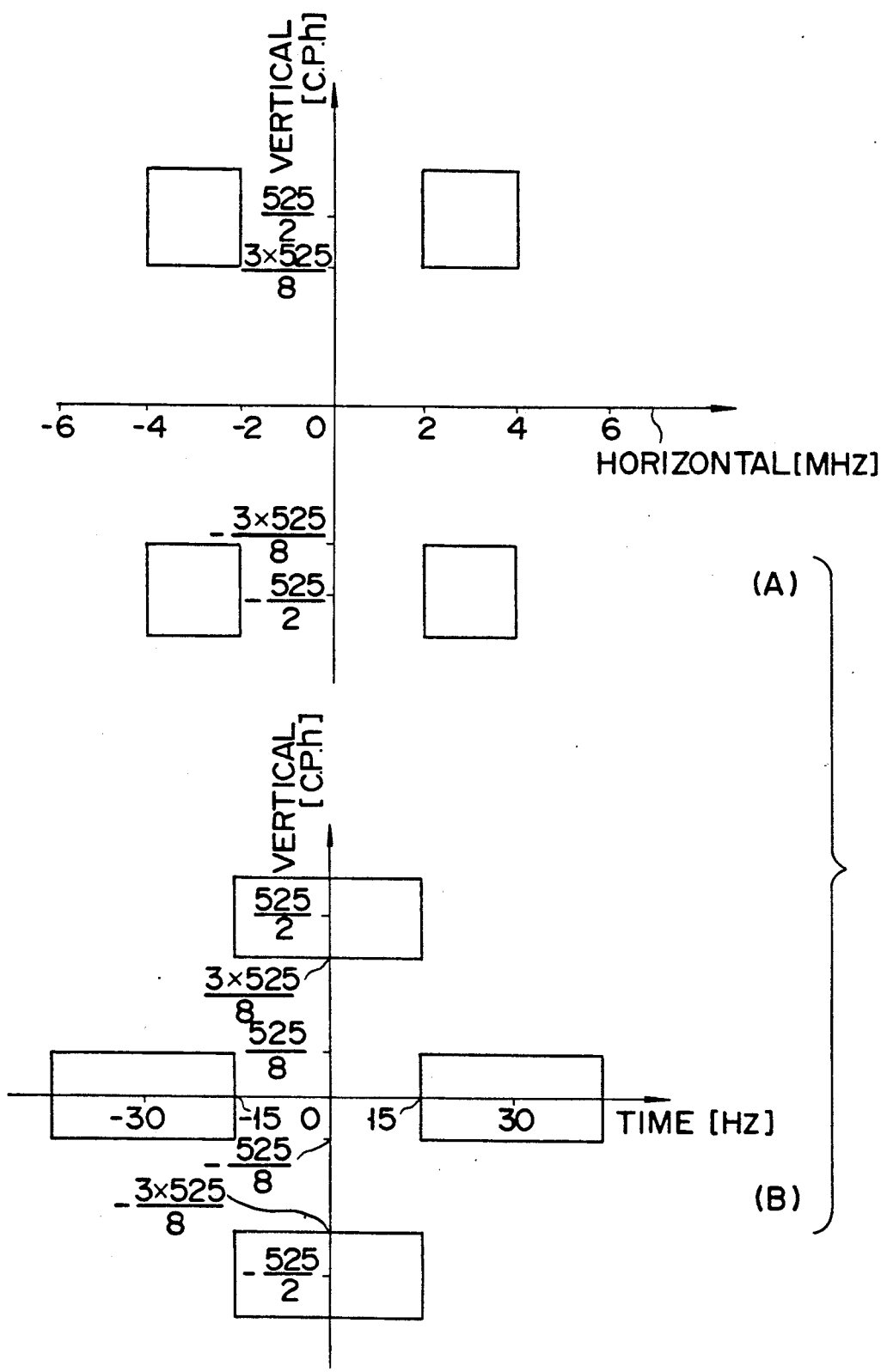
FIGS. 13A and 13B are explanatory diagrams of the spectrum in a spatial frequency region for the output of the BPF shown in FIG. 5.

Referring to FIG. 11, the shaded portion represents a returning component produced by the modulation. The returning component has a horizontal domain of 0 to 2 MHz. Accordingly, the output of the multiplier 64 is band-limited by a horizontal band pass filter (BPF) 65 having a pass band of 2 to 4 MHz, thus providing the helper signal $Y_2'$ having the returning component removed, as shown in FIG. 12. FIG. 13A shows the spectrum of the horizontal-vertical range of the helper signal $Y_2'$ and FIG. 13B the spectrum of the time-vertical region. As shown in FIG. 13, the modulation by the multiplier 64 and the function of the BPF 65 causes the helper signal $Y_2'$ to be put at the position with a vertical domain of 525/2 [c.p.h] and a horizontal band of 2 to 4 MHz, which corresponds to the removed region of the LPF 56.

The helper signal $Y_2'$ from the BPF 65 is supplied via a switch 66 to an adder 57 to be frequency-division multiplexed with the main signal $Y_1$.

The ON/OFF operation of the switch 66 is controlled in accordance with the output of a motion detector 67. The motion detector 67 obtains the difference between frames of a luminance signal Y input from the input terminal 51 and compares the level with a predetermined level to thereby discriminate whether an image is a dynamic image or still image. The switch 66 is rendered ON only when the image is discriminated to be a still image by the motion detector 67. Accordingly, the helper signal $Y_2'$ is frequency-division multiplexed with the main signal $Y_1$ only in the case of a still image.

The control signal X is prepared as described below.

The main signal $Y_1$ band-limited by the LPF 56 is supplied to a high-pass filter (HPF) 68 which extracts a component with a horizontal band of 2 to 4 MHz. This component is shown as $Y_3$ in FIG. 7. As the high-frequency component $Y_3$ acquired from the main signal $Y_1$ does not contain a DC component, it can be said to have a higher correlation with the helper signal $Y_2$ than the main signal $Y_1$. According to this embodiment, therefore, the control signal X is prepared using this high-frequency component $Y_3$.

The absolute value of the high-frequency component $Y_3$ is obtained by an absolute value circuit 69, then is accumulated by an accumulator 70. The accumulated output is added to a fixed value B by an adder 71. The result is supplied as the control signal X to the divider 63.

Multiplexing of the chrominance signals I and Q is executed as described below.

The chrominance signal I from the input terminal 52 is modulated by a multiplier 72 using a carrier signal of a frequency fsc. The modulated output is band-limited to have a horizontal band of 0 to 1.5 MHz by a LPF 73. The chrominance signal Q from the input terminal 53 is modulated by a multiplier 74 using a carrier signal of a frequency fsc, which has a phase difference of 90 degrees from the phase of the carrier signal of the former signal I. The modulated output has its horizontal band band-limited to 0 to 0.5 MHz by a LPF 75.

The outputs of the LPFs 73 and 75 are frequency-division multiplexed by an adder 76. The multiplexed output is then sent to the adder 58 where it is frequency-division multiplexed with a multiplexed signal objected through frequency-division multiplication of the main signal $Y_1$ and helper signal $Y_2'$.

The above is a description of the general structure of the multiplexed signal transmitter shown in FIG. 5. Specific structures of the 2D LPF 56 and vertical LPF 61 will now be described.

To begin with, the 2D LPF 56 will be described.

Figure 14:
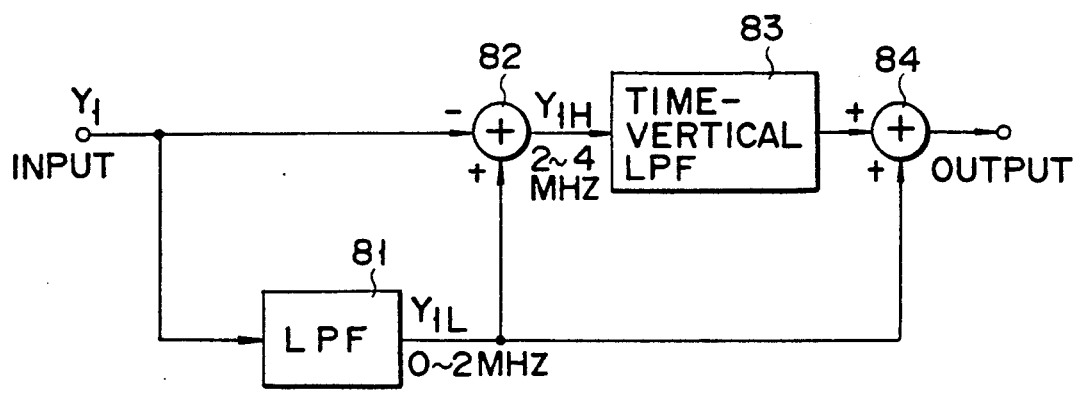
FIG. 14 is a circuit diagram illustrating a specific structure of the 2D LPF shown in FIG. 5.

FIG. 14 is a circuit diagram exemplifying a specific structure of the 2D LPF 56.

Referring to this figure, the main signal $Y_1$ output from the LPF 54 in FIG. 5 is separated into a low-frequency component having a horizontal band of 0 to 2 MHz and a high-frequency component of 2 to 4 MHz by a horizontal LPF 81 with a cut-off frequency of 2 MHz and an adder 82. The high-frequency component from the adder 82 has its horizontal band limited to 0 to $(3\times525)/8$[c.p.h.] by a time-vertical LPF 83. The band-limited output is frequency-multiplexed with the low-frequency component from the LPF 81 by an adder 84, thus yielding the main signal $Y_1$ band-limited to have the spectrum as shown in FIG. 8.

The vertical LPF 61 will not be described.

Figure 15:
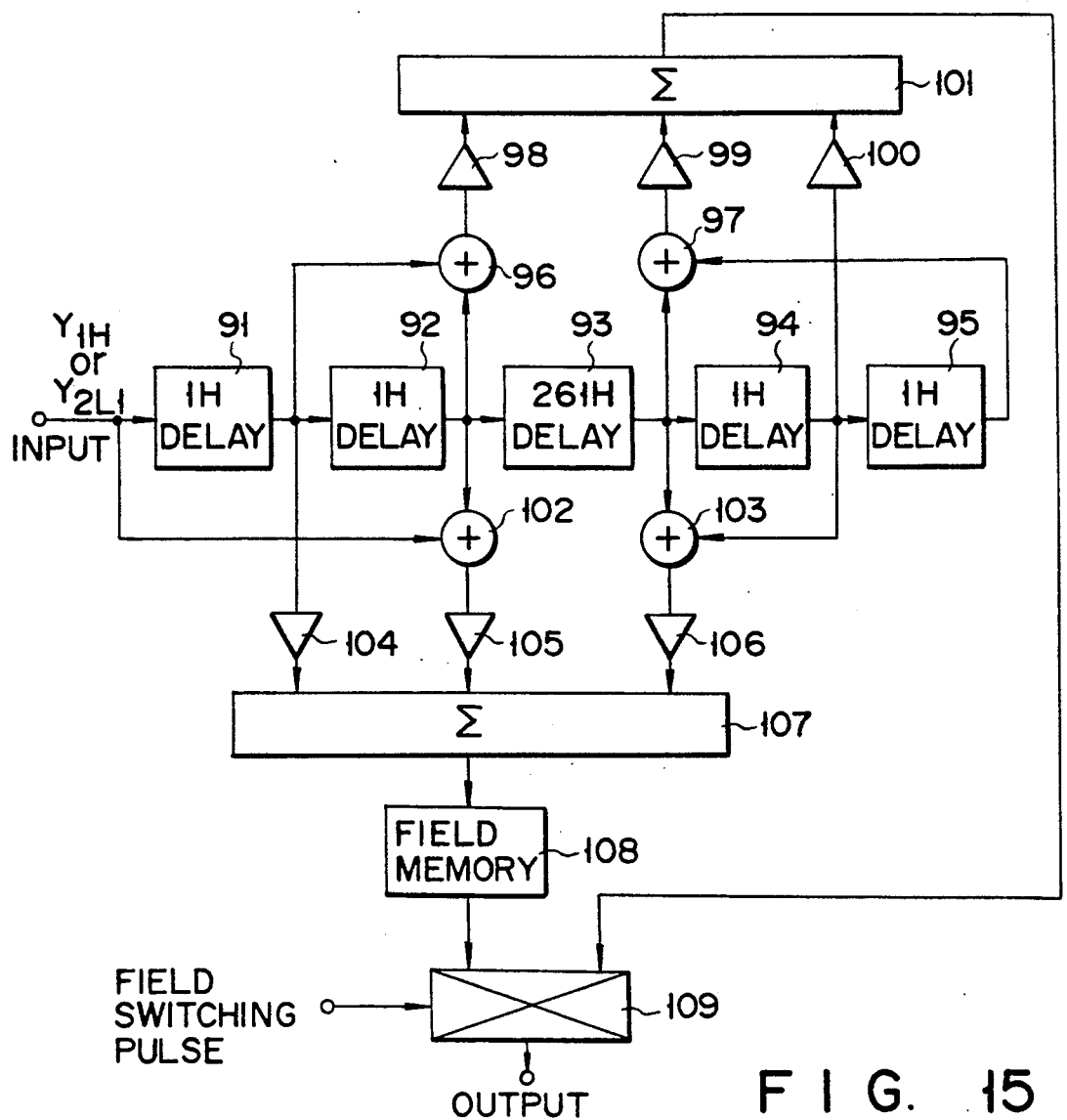
FIG. 15 is a circuit diagram illustrating a specific structure of the vertical LPF shown in FIG. 5.

FIG. 15 is a circuit diagram exemplifying a practical structure of the LPF 61.

Figure 16:
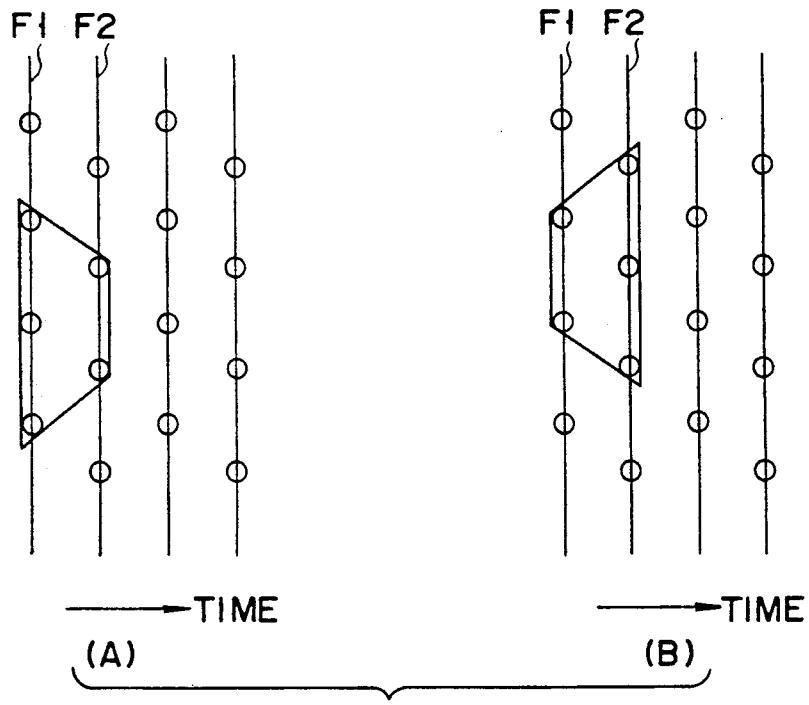
FIGS. 16A and 16B are explanatory diagrams of a field signal given for explaining the operation of the circuit shown in FIG. 15.

Referring to FIG. 15, 1H delay circuits 91 and 92, a 261H delay circuit (1 field delay circuit) 93, 1H delay circuits 94 and 95, adders 96 and 97, coefficient multipliers 98, 99 and 100, and an adder 101 constitute a low-pass filter (LPF) for the first field in a frame. This LPF has five taps; FIG. 16A presents an exemplary diagram of lines that are to be subjected to a filtering operation.

Also, the 1H delay circuits 91 and 92, the 261H delay circuit 93, the 1H delay circuit 94, adders 102 and 103, coefficient multipliers 104, 105 and 106, and an adder 107 constitute a low-pass filter (LPF) for the second field in a frame. Likewise, this LPF has five taps; FIG. 16B presents an exemplary diagram of lines that are to be subjected to a filtering operation.

The output of the adder 107 is delayed by one field by a field memory 108. This delayed output and the output of the adder 101 are alternately selected for every field by a selector 109. As a result, the selector 109 provides a helper signal $Y_2$ band-limited as shown in FIG. 10.

Since the LPF output of the first field is delayed by one field by the 261H delay circuit 93, the field memory 108 delays the LPF output of the second field by one field to control the time.

As the output of the vertical LPF 61 is delayed by one field with respect to the original signal, the control signal X as shown in FIG. 5 is actually delayed by one field with respect to the original signal.

This completes a description of the multiplexed signal transmitter shown in FIG. 5. A description will now be given of the multiplexed signal receiver shown in FIG. 6.

Referring to FIG. 6, a received multiplexed signal enters through an input terminal 111. This multiplexed signal is separated into a luminance signal $Y_0$ (main signal $Y_1$ multiplexed with a helper signal $Y_2'$) and a chrominance signal C by a Y/C separator 112.

Figure 17:
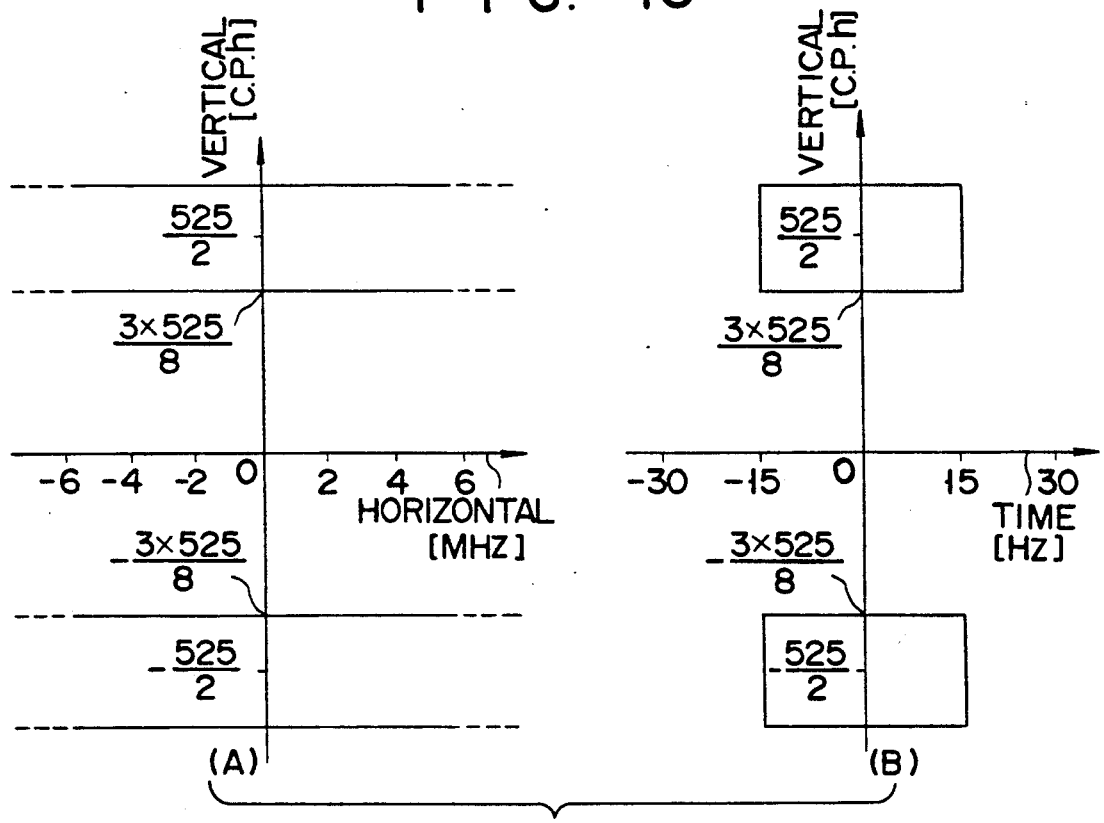
FIGS. 17A and 17B are explanatory diagrams of the spectrum in a spatial frequency region for the output of a horizontal/vertical HPF shown in FIG. 6.
Figure 18:
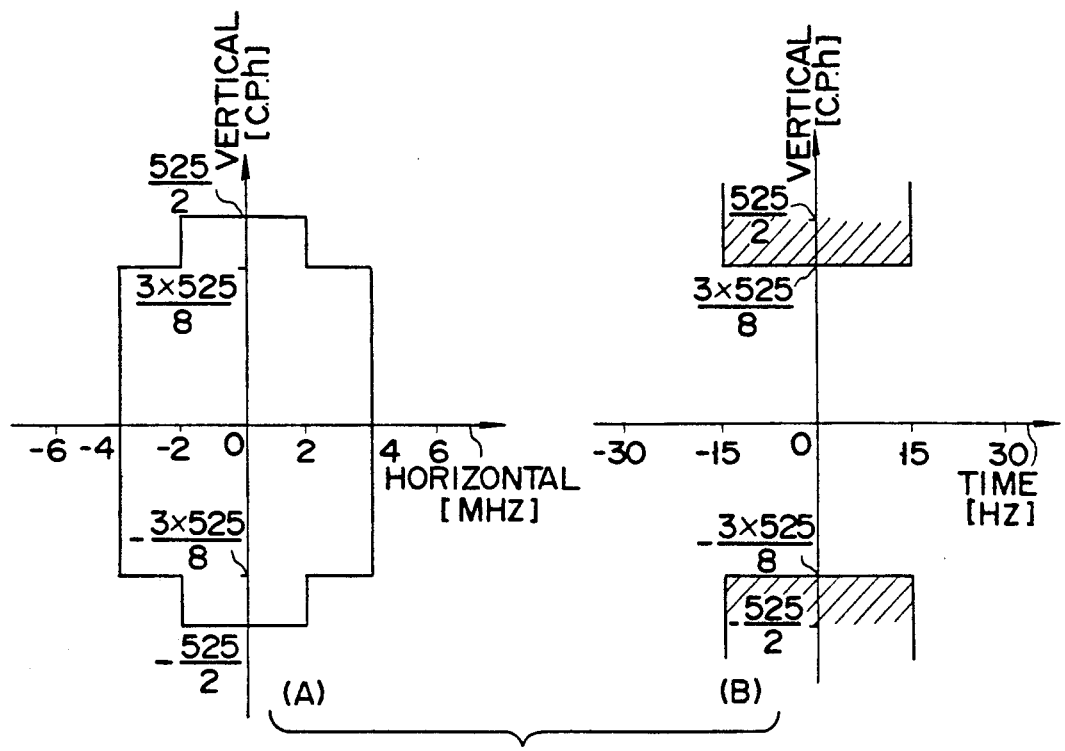
FIGS. 18A and 18B are explanatory diagrams of the spectrum in a spatial frequency region for the output of an adder 116 shown in FIG. 6.

The luminance signal $Y_0$ is further separated into the main signal $Y_1$ and the helper signal $Y_2'$ by a field delay circuit 113, a 2D HPF 114, an HPF 115 and an adder 116. That is, the luminance signal $Y_0$ is band-limited to a high frequency region as shown in FIG. 17, by the 2D HPF 114. This band-limited output has its horizontal band limited within 2 to 4 MHz by the HPF 115, thereby providing the helper signal $Y_2'$ multiplexed in the eliminated region, which has been described with reference to FIG. 5. An adder 116 subtracts this helper signal $Y_2'$ from the luminance signal $Y_0$ supplied through the delay circuit 113 and provides the main signal $Y_1$ band-limited as shown in FIG. 18 (corresponding to FIG.8).

The 2D HPF 114 has the same structure as the vertical LPF 61 shown in FIG. 15, and is so designed to have the output characteristics shown in FIG. 17 by changing the coefficients of the coefficient multipliers 98, 99, 100, 104, 105 and 106. The delay circuit 113 delays the luminance signal $Y_0$ by one field in accordance with the helper signal $Y_2'$ being delayed by one field by the 2D LPF 114.

The main signal $Y_1$ from the adder 116 is supplied to an adder 117 which in turn frequency-multiplexes the signal $Y_1$ with a helper signal $Y_2$ that is reproduced from the helper signal $Y_2'$. This provides a luminance signal Y having a horizontal band of 0 to 6 MHz. This luminance signal Y is supplied to a display section (not shown) which is connected to an output terminal 118.

The helper signal $Y_2$ is reproduced as described below.

Figure 19:
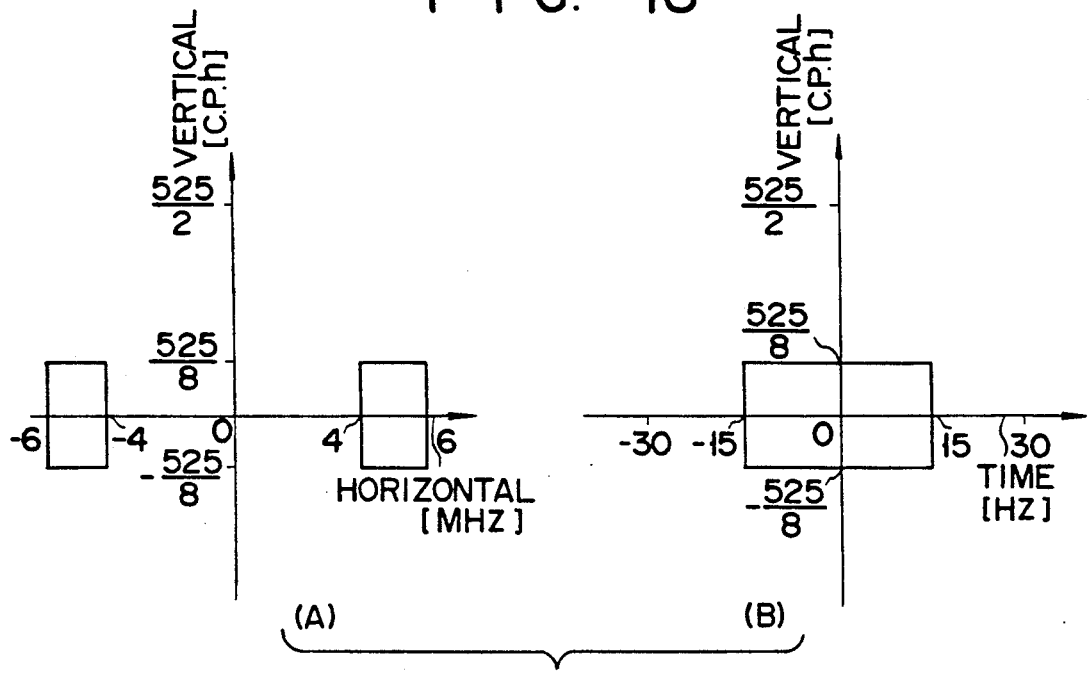
FIGS. 19A and 19B are explanatory diagrams of the spectrum in a spatial frequency region for the output of a BPF 120 shown in FIG. 6.

The helper signal $Y_2'$ from the HPF 115 is demodulated by a multiplier 119 using a 16/7 fsc carrier signal whose phase is inverted for every field as is done on the transmitter side. The demodulated output is supplied to a BPF 120, which in turn extracts a component with a horizontal band of 4 to 6 MHz and thus provides a helper signal $Y_2'$ having the spectrum shown in FIG. 19 (corresponding to FIG. 10). This helper signal $Y_2'$ is multiplied by the control signal X (as a multiplier), acquired from the main signal $Y_1$ by a multiplier 121 in contrast with the control signal X serving as a divisor on the transmitter side. This multiplication is expressed by the aforementioned equation (3).

Figure 20:
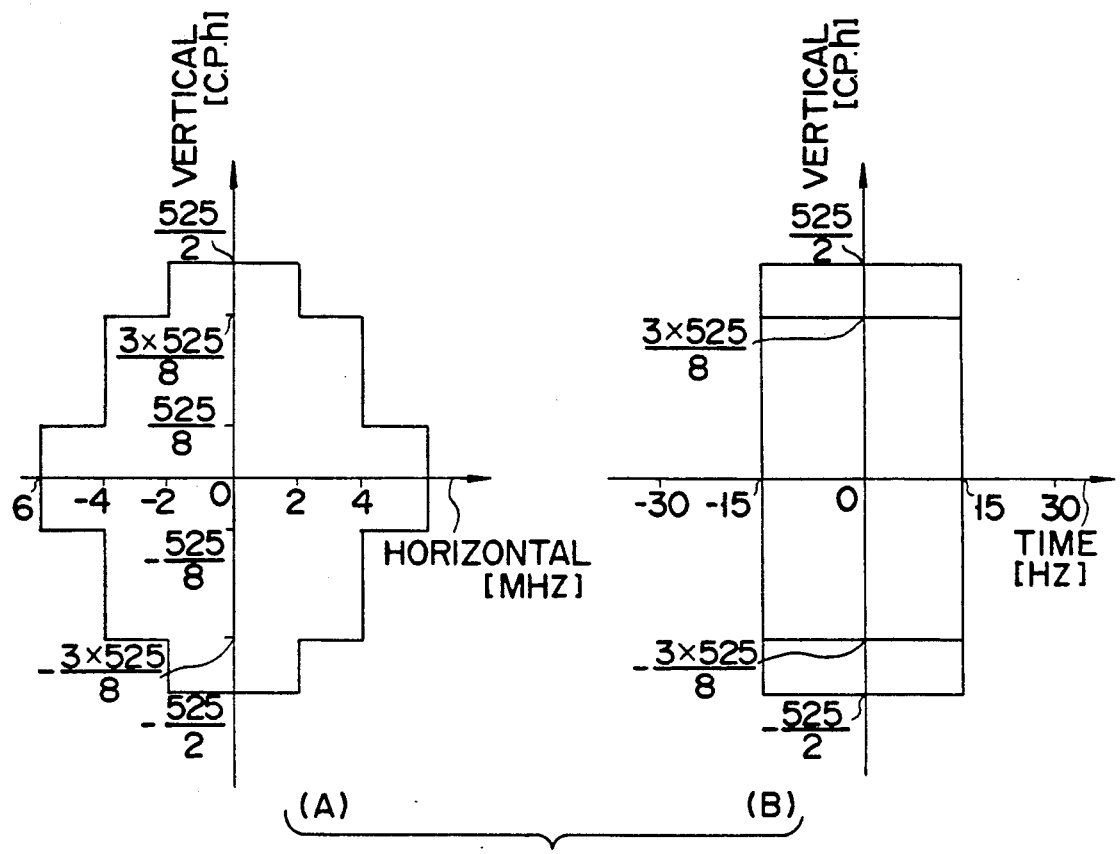
FIG. 20A and 20B are explanatory diagrams of the spectrum in a spatial frequency region for the output of an adder 117 shown in FIG. 6.

The helper signal $Y_2$ from the multiplier 121 is multiplied by 1/A by a level converter 122, as opposed to the multiplication by a factor of A done on the transmitter side. The output of the level converter 122 is supplied via a switch 123 to the adder 117 to be frequency-division multiplexed with the main signal $Y_1$. As a result, the luminance signal Y having the spectrum shown in FIG. 20 is obtained.

The ON/OFF operation of the switch 123 is controlled by a motion detector 124. The motion detector 124 obtains the difference between frames of a luminance signal $Y_0$ output from the Y/C separator to discriminate whether an image is a dynamic image or still image. The switch 123 is rendered ON only when the image is discriminated to be a still image by the motion detector 124. Accordingly, the helper signal $Y_2$ is frequency-division multiplexed with the main signal $Y_1$ only in the case of a still image.

The control signal X is prepared as described below.

The main signal $Y_1$ from the adder 116 is supplied to an HPF 124 which extracts a high-frequency component $Y_3$ with a horizontal band of 2 to 4 MHz. The absolute value of the high-frequency component $Y_3$ is obtained by an absolute value circuit 125, then is accumulated by an accumulator 126, as is done on the sender side. The accumulated output is added to a fixed value B by an adder 127. The result is supplied as the control signal X to the divider 121.

The accumulation done by the accumulator 126 is shown by the aforementioned equation (1).

The chrominance signal C is demodulated as descried below.

The chrominance signal C from the Y/C separator 112 is demodulated by multipliers 128 and 129, using carrier signals of a frequency fsc which have a phase difference of 90 degrees. After the demodulation, the multipliers 128 and 129 respectively output the chrominance signals I and Q. These signals I and Q are band-limited to 0 to 1.5 MHz and 0 to 0.5 MHz by LPFs 130 and 131, respectively, and the resultant signals are supplied to an image display section (not shown) connected to output terminals 132 and 133.

Figure 21:
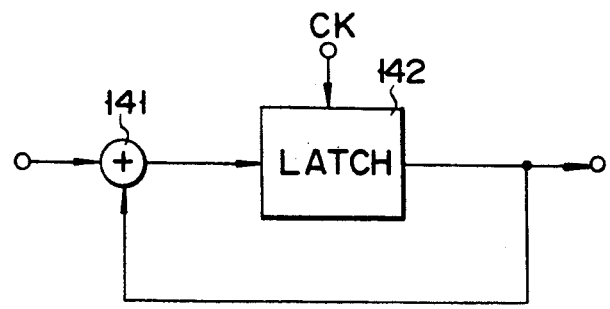
FIG. 21 is a circuit diagram illustrating another embodiment of accumulators shown in FIGS. 5 and 6.

Although the accumulators 70 and 126 are shown as a circuit having uni-delay circuits and an adder in FIGS. 5 and 6, they may be constituted by an adder 141 and a latch circuit 142, which is driven by clock CK of one clock period, as shown in FIG. 21.

The foregoing description has been given with reference to a case where the present invention is applied to a multiplexed signal transmitter and multiplexed signal receiver of a system which transmits a horizontal high definition signal as a helper signal Y. In this case, it is of course possible to reproduce the helper signal $Y_2$ with a high fidelity and eliminate the interference of the helper signal $Y_2$ with the main signal $Y_1$ at the edge portion of an image.

Further, according to this embodiment, since the control signal X is prepared using the high-frequency component $Y_3$ of 4 to 6 MHz having a higher correlation with the helper signal $Y_2$, the effect of reducing the interference of the helper signal $Y_2$ with the main signal $Y_1$ can be further improved.

The separation of the frequency-division multiplexed signal may be executed by a technique disclosed in the document "Extended Definition TV Fully Compatible with Existing Standards," Fukinuke et al., IEEE TRANSACTION ON COMMUNICATIONS, VOL. COM-30, NO. 8, AUG. 1984."

Figure 22:
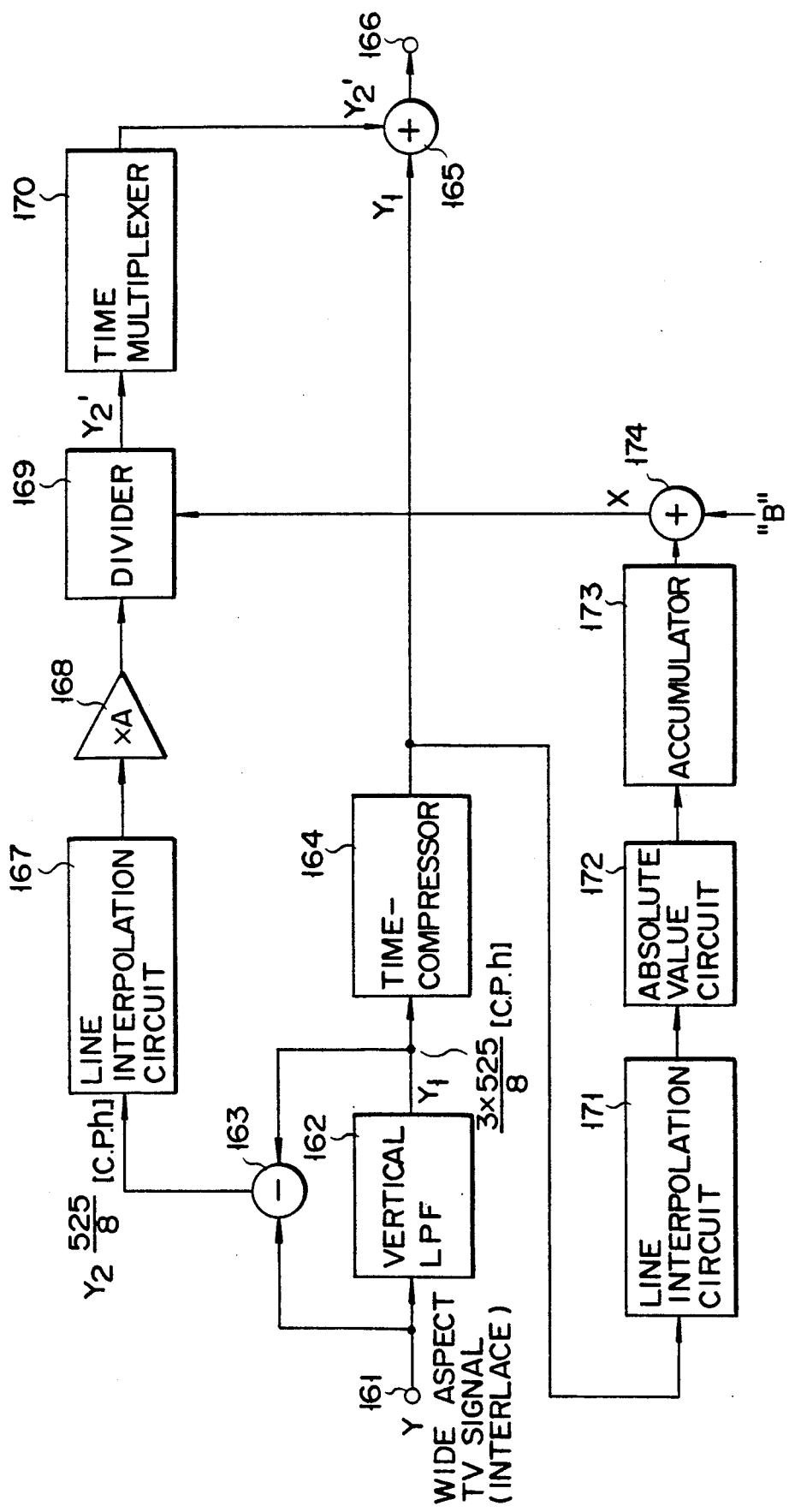
FIG. 22 is a circuit diagram illustrating the fourth embodiment of a multiplexed signal transmitter according to this invention.

FIG. 22 is a circuit diagram illustrating the fourth embodiment of a multiplexed signal transmitter according to this invention. FIG. 23 is a circuit diagram illustrating the fourth embodiment of a multiplexed signal receiver according to this invention.

In this embodiment, the present invention is applied to a multiplexed signal transmitter and multiplexed signal receiver of a system which transmits a vertical high definition signal as a helper signal $Y_2$.

Such a system is a wide aspect system designed to display a screen having a larger aspect ratio than the one obtained by the existing system.

An example of the wide aspect system designed in consideration of compatibility with the existing system will be described below referring to FIGS. 24 and 25.

Figure 24:
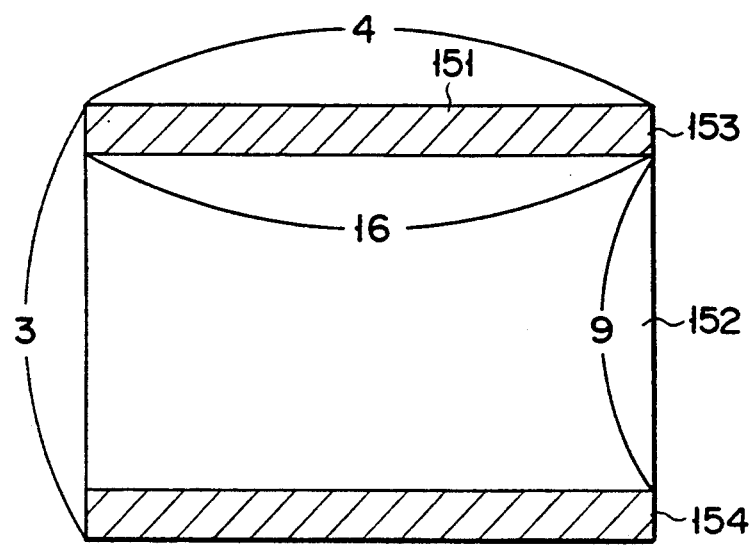
FIG. 24 is a diagram illustrating the screen format in a case where a television signal of a wide aspect system is received by a television receiver of the existing NTSC system.
Figure 25:
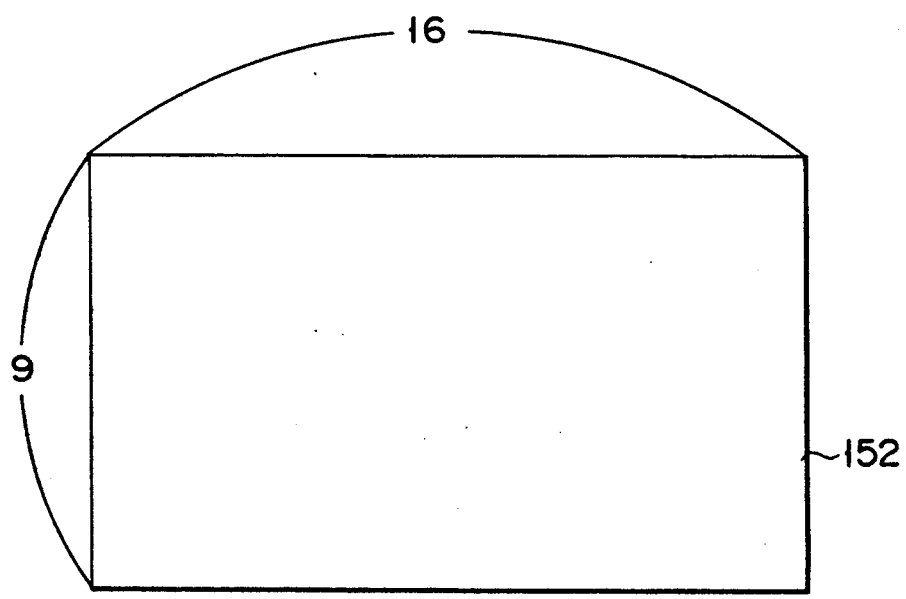
FIG. 25 is a diagram illustrating the screen format in a case where a television signal of a wide aspect system is received by a television receiver of the wide aspect system.

FIG. 24 illustrates the screen format in a case where a television signal of a wide aspect system is received by a television receiver of the existing NTSC system, and FIG. 25 illustrates the screen format in a case where a television signal of a wide aspect system is received by a television receiver of the wide aspect system.

In FIG. 24, numeral 151 is a NTSC screen with an aspect ratio of 4:3, numeral 152 is a wide aspect screen with an aspect ratio of 16:9, and numerals 153 and 154 are screens having a constant luminance. As illustrated, the wide aspect screen 151 is time-compressed in the vertical direction to be within the NTSC screen 152. Adding the screens 153 and 154 respectively to the top and bottom of the wide aspect screen 152 provides the NTSC screen 151.

When such a television signal is received by a television receiver of a wide aspect system, expanding the wide aspect screen 152 in the vertical direction permits the screen 152 to be displayed in the entire screen display region of the television receiver as shown in FIG. 25.

Provided that the vertical resolution of the television receiver is 480 lines, when a television signal of the wide aspect system is received by a television receiver of the NTSC system, the vertical resolution of the wide aspect screen becomes 360 lines, as compared with 480 lines which is the case where the television signal is received by the television receiver of the wide aspect system.

With the above arrangement, the vertical high definition signal for each line, i.e., the helper signal $Y_2$, is frequency-division multiplexed with those portions corresponding to the screens 153 as upper side area and 154 as lower side area. In this case, since the helper signal $Y_2$ includes a component of 525/4 [c.p.h], $Y_2$-originated interference would prominently appear at those portions corresponding to the screens 153 and 154 in the television receiver of the NTSC system.

This embodiment can provide apparatuses which can eliminate the interference of the helper signal $Y_2$ with the main signal $Y_1$ and accurately reproduce the helper signal $Y_2$.

The multiplexed signal receiver shown in FIG. 22 will now be described. It should be noted that FIG. 22 shows only a system of processing a luminance signal and a system of processing a chrominance signal is omitted.

Referring to FIG. 22, numeral 161 is an input terminal for a luminance signal Y of a television signal of the wide aspect system. This luminance signal Y is an interlace signal, for example.

Figure 26:
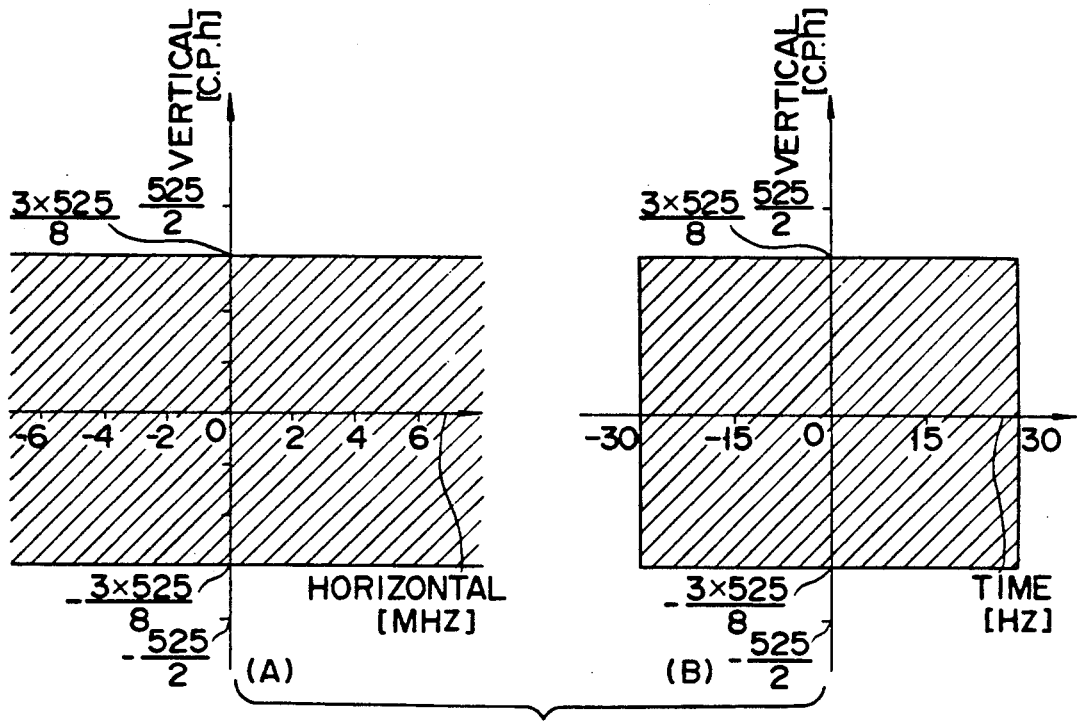
FIGS. 26A and 26B are explanatory diagrams of the spectrum in a spatial frequency region for the output of a vertical LPF 162 shown in FIG. 22.
Figure 27:
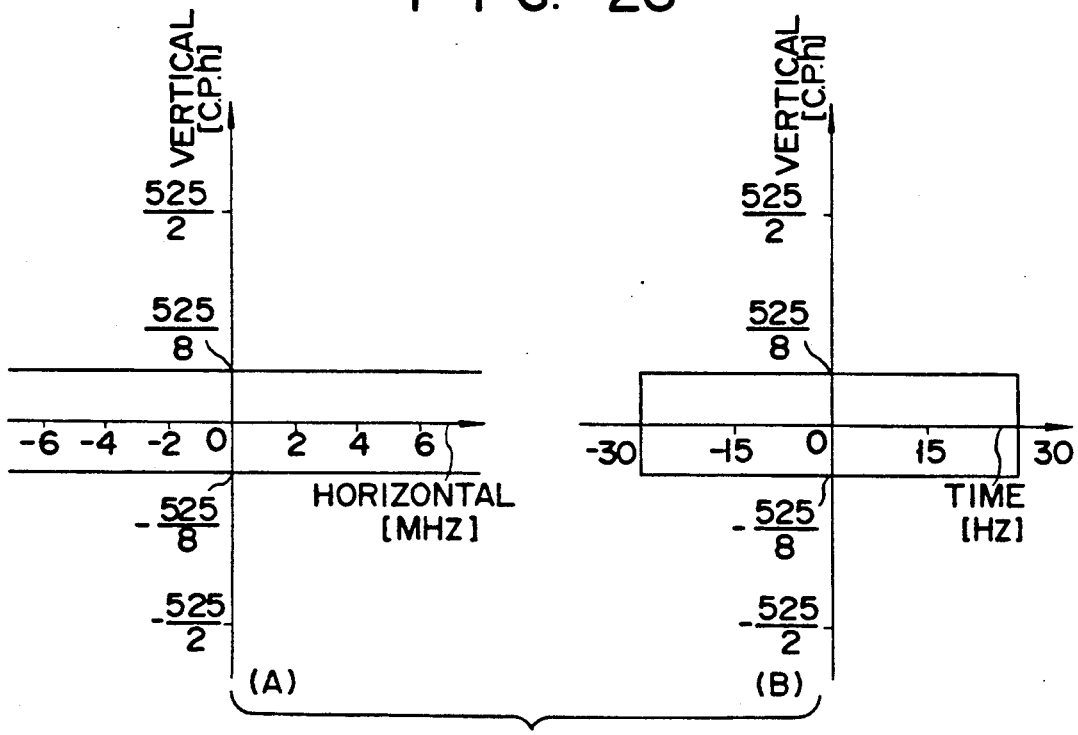
FIGS. 27A and 27B are explanatory diagrams of the spectrum in a spatial frequency region for the output of a subtracter 163 shown in FIG. 22.

The luminance signal Y from the input terminal 161 is separated into a vertical low-frequency component and a vertical high-frequency component by a vertical LPF 162 and a subtracter 163. The low-frequency component from the LPF 162 has a vertical band of $(3 \times 525)/8$ [c.p.h], as shown in FIG. 26, and is treated as a main signal $Y_1$. The high-frequency component from the subtracter 163 has a vertical band of 525/8 [c.p.h], as shown in FIG. 27, and is treated as a helper signal $Y_2$ for high definition.

As shown in FIG. 28, the LPF 162 is a low-pass filter for a signal within a field, which comprises 1H delay circuits 181 to 185, adders 186 and 187, coefficient multipliers 188 to 190, and an adder 191.

The main signal $Y_1$ is multiplied by a factor of ¾ in the vertical direction by a time-compressor 164, so that it fits in the NTSC screen 151, as shown in FIG. 29. The time-compressor 164 is constituted by an interpolation filter as shown in FIG. 30.

The interpolation filter delays the main signal $Y_1$ from an input terminal 201 by 1H delay circuits 203 to 205, multiplies individual tap outputs by coefficients by coefficient multipliers 206 to 209, adds the resultant outputs together by an adder 210, and outputs the added result from an output terminal 211. In this case, the coefficients of the coefficient multipliers 206-209 are so set that they, when summed, become 1. Since the coefficients vary depending on formed lines, they can be selected line by line. Accordingly, the time-compressed main signal $Y_1$ is output from the output terminal 211.

The time-compressor 164 adds a signal having a constant luminance to the thus obtained main signal $Y_1$ at those portions corresponding to the screens 153 and 154, and outputs the resultant signal. FIG. 31 illustrates how time-compression is done. The time-compression restores the vertical band of the main signal $Y_1$ to 0 to 525/2 [c.p.h].

The main signal $Y_1$ added with the signal having a constant luminance is time-multiplexed with a helper signal $Y_2'$ by an adder 165. The multiplexed signal is sent to a transmitting section (not shown) connected to an output terminal 166.

The helper signal $Y_2$ is subjected to line interpolation by a line interpolation circuit 167. Considering both of the first field $F_1$ and second filed $F_2$, this line interpolation is carried out so as to extract a signal every four lines as shown in FIG. 32. Actually, however, the signals for the first field $F_1$ are thinned out every other line, and the signals for the second field $F_2$ are all thinned out.

The helper signal $Y_2$ from the line interpolation circuit 167 is multiplied by a factor of A by a level converter 168. The resultant output is subjected to division by a divider 169 using the control signal X obtained from the main signal $Y_1$ as a divisor. Those portions of a helper signal $Y_2'$ resulting from the division which correspond to the shaded portions or the screens 153 and 154 in FIG. 29 are delayed for a time-multiplexing process by a time multiplexer 170. The delayed helper signal $Y_2'$ is multiplexed with the time-compressed main signal $Y_1$ by the adder 165, thus yielding the multiplexed signal as shown in FIG. 29.

The control signal X is prepared as described below.

The main signal $Y_1$ from the time-compressor 164 is subjected to line interpolation by a line interpolation circuit 171 in such a way that signals are extracted every three lines in the vertical direction. This line interpolation corresponds to the process done by the line interpolation circuit 167.

The output of the circuit 171 is sent to an absolute value circuit 172 which acquires its absolute value. The absolute value is accumulated for N pixels by an accumulator 173. The accumulated output is added to a fixed value B by an adder 174, and the result is supplied as the control signal X to the divider 169. As a result, the helper signal $Y_2'$ expressed by the equation (2) is obtained from the divider 169.

The multiplexed signal receiver shown in FIG. 23 will now be described. In FIG. 23, a system for processing a chrominance signal is likewise omitted.

Referring to FIG. 23, numeral 221 denotes an input terminal for a transmitted multiplexed signal. Of the multiplexed signal coming from the input terminal 221, a main signal $Y_1$ is time-compressed by 4/3 by a time-expander 222. As a result, the vertical band of the main signal $Y_1$ is narrowed to 0 to $(3 \times 525)/8$[c.p.h].

The main signal $Y_1$ from the time-expander 222 is time-multiplexed with a reproduced helper signal $Y_2$ by an adder 223, thus yielding a luminance signal Y with a wide aspect ratio which includes a vertical high definition component. This luminance signal Y is supplied to an image display section (not shown) connected to an output terminal 224 to be displayed.

The helper signal $Y_2$ is reproduced as described below.

The multiplexed signal from the input terminal 221 is supplied to a helper signal separator 225, which separates the helper signal $Y_2'$ time-multiplexed at the positions of the screens 153 and 154, from the input signal. This helper signal $Y_2'$ is subjected to delay adjustment in a delay controller 226 before being supplied to a multiplier 227. The delay controller 226 serves to make the time axis of the helper signal $Y_2'$ for each line coincide with the time axis of the line thinned out at the time of signal transmission, as shown in FIG. 33. In this case, the delay controller 226 does not adjust the time retroactively, but actually, a field delay circuit is provided in a line interpolation circuit 230 (which will be described later) to perform signal processing with a delay for one field.

The helper signal $Y_2'$ thus delay-controlled is multiplied by the control signal X acquired from the main signal $Y_1$ by a multiplier 227, thus reproducing the helper signal $Y_2$.

The reproduced helper signal $Y_2$ is multiplied by a factor of 1/A by a level converter 228 having the opposite characteristic to that of the level converter provided on the sender side. The vertical band of the resultant output is limited to 525/8 [c.p.h] by a vertical LPF 229, and is frequency-multiplexed with the main signal $Y_1$ having a vertical band of $(3 \times 525)/8$[c.p.h] in an adder 223.

The control signal X is prepared by the line interpolation circuit 230, an absolute value circuit 231, an accumulator 232 and an adder 233, as per on the sender side.

Although the foregoing description of this embodiment has been given with reference to a case where this invention is applied to apparatuses of the wide aspect system which transmits a vertical high definition component, it is possible in this case to reduce the interference of the helper signal $Y_2$ with the main signal $Y_1$ and accurately reproduce the helper signal $Y_2$.

The present invention is not restricted to the above-described embodiments. For instance, although the foregoing description of the embodiments has been given with reference to a case where the absolute value or a square of the main signal is accumulated in order to detect the energy of the main signal, other structures may be used.

Although the foregoing description of the embodiments has been given with reference to a case where the helper signal is subjected to division on the sender side and to multiplication on the receiver side in order to control the level of the helper signal, other controls may be employed as long as the opposite controls are executed between the sender side and the receiver side.

Although the foregoing description of the embodiments has been given with reference to a case where the helper signal is a horizontal or vertical high definition signal, other signals may be used as long as they have a correlation with the main signal.

The present invention may be modified in other various manners without departing from the scope and spirit of the invention.

As described above, this invention can eliminate the interference of the helper signal with the edge portion of the main signal and can accurately reproduce the helper signal.

What is claimed is:

1. A multiplexed signal transmitter comprising:
   energy detecting means for detecting energy of a plurality of pixels of a main signal as a television signal;
   level control means for controlling a level of a helper signal having a correlation with said main signal, based on a detection output of said energy detecting means; and frequency-division multiplexing means for frequency-division multiplexing said helper signal having its level controlled by said level control means, with said main signal.

2. A multiplexed signal transmitter according to claim 1, wherein a vertical oblique component of said main signal which has a vertical frequency band of $\pm[(3\times525)/8]$ to $\pm[525/2]$ (c.p.h) and a horizontal frequency band of $\pm2$ MHz or greater in a spatial frequency region of a television signal is removed by a filter section and has a removed region.

3. A multiplexed signal transmitter according to claim 2, wherein said helper signal is frequency-shifted by a 2 dimensional filter to be frequency-division multiplexed with said removed region.

4. A multiplexed signal receiver comprising:
a receiver for receiving a multiplexed signal acquired by frequency-division multiplexing a helper signal having a correlation with a main signal as a television signal with said main signal, said helper signal having a level controlled on the basis of an output resulting from detection of energy of a plurality of pixels of said main signal;

frequency-division multiplexed signal separating means for frequency-division separating said multiplexed signal into said main signal and said helper signal;

energy detecting means for detecting energy of a plurality of pixels of said main signal separated by said frequency-division multiplexed signal separating means; and level control means for controlling a level of said helper signal, separated by said frequency-division multiplexed signal separating means, in a characteristic opposite to that obtained on a sender side, based on a detection output of said energy detecting means.

5. A multiplexed signal receiver according to claim 4, wherein said energy detecting means includes:
level detecting means for detecting a level of said main signal; and
accumulating means for accumulating a detection output of said level detecting means for a plurality of pixels.

6. A multiplexed signal receiver according to claim 4, wherein said level control means controls a level of said helper signal by a sum of a detection output of said energy detecting means and a fixed value.

7. A multiplexed signal receiver according to claim 4, wherein said helper signal is a signal for high definition of an image.

8. A multiplexed signal receiver according to claim 7, wherein said energy detecting means detects energy of that of said main signal excluding at least a DC component.

9. A multiplexed signal transmitter comprising:
energy detecting means for detecting energy of a main signal as a television signal for a plurality of pixels;

level control means for controlling a level of a helper signal having a correlation with said main signal, based on a detection output of said energy detecting means; and time-multiplexing means for time-multiplexing said helper signal having undergone level control by said level control means, with said main signal.

10. A multiplexed signal transmitter according to claim 9, wherein said main signal and said helper signal constitute a television signal of a wide band, said main signal is a low-frequency component of said television signal and said helper signal is a high-frequency component having a correlation with said main signal, and said time-multiplexing means time-multiplexes said helper signal with upper and lower side areas of a screen formed by said main signal.

11. A multiplexed signal receiver comprising:
a receiver for receiving a multiplexed signal including a main signal as a low-frequency component of a television signal of a wide band and a helper signal as a high-frequency component of said television signal, said multiplexed signal having said main signal time-compressed and having said helper signal subjected to level control by energy of said main signal for a plurality of pixels and time-multiplexed with upper and lower side areas of said time-compressed main signal;

separating means for separating said multiplexed signal into said main signal and said helper signal at said upper and lower side areas;

time-expanding means for time-expanding said main signal;

energy detecting means for sequentially detecting energy of said main signal for a plurality of pixels;

level control means for controlling a level of said helper signal output from said separating means in accordance with an output of said energy detecting means; and multiplexing means for frequency-division multiplexing said helper signal from said level control means with said time-expanded main signal.

12. A multiplexed signal receiver according to claim 11, wherein said helper signal includes a signal for a side panel of a wide aspect television signal and signals of first and second fields, and at least said signal of said second field is time-multiplexed with said vertical overscan portion.

13. A multiplexed signal transmitter comprising:
energy detecting means for detecting the energy of a plurality of pixels of a main signal, said main signal being the high frequency component of the second field of a side panel signal, said side panel signal being obtained by a wide aspect television signal being divided into a center panel signal and said side panel signal;

level control means for controlling the level of a helper signal having a correlation with said main signal, said helper signal being the high frequency component in the first field of said side panel signal;

time-multiplexing means for time-multiplexing said main signal with a vertical over-scan portion of said center panel signal; and frequency-division multiplexing means for frequency-division multiplexing said helper signal, the level of which is controlled by said level control means, with said center panel signal.

14. A multiplexed signal receiver comprising:
a receiver for receiving a multiplexed signal including a center panel signal and a side panel signal of a wide aspect television signal;

time-separating means for separating a main signal, which is high frequency component in the second field of said side panel signal, from a vertical over-scan portion of said center panel signal;

energy detecting means for detecting the energy of a plurality of pixels of said main signal, separated from said vertical over-scan portion;

frequency-separating means for separating a helper signal, which is the high frequency component in the first field of said side panel signal, from said center panel signal; and level control means for controlling the level of said helper signal, separated by said frequency-separating means, in a characteristic opposite to that obtained on a sender side, based on the detection output of said energy detecting means.

* * * * *